(12) United States Patent
Felts

(10) Patent No.: US 8,245,216 B2
(45) Date of Patent: Aug. 14, 2012

(54) PATCH MANAGEMENT SYSTEM

(75) Inventor: David Felts, Denville, NJ (US)

(73) Assignee: Oracle International Corporation, Redwood Shores, CA (US)

(*) Notice: Subject to any disclaimer, the term of this patent is extended or adjusted under 35 U.S.C. 154(b) by 1162 days.

(21) Appl. No.: 11/539,261

(22) Filed: Oct. 6, 2006

(65) Prior Publication Data

US 2007/0113225 A1  May 17, 2007

Related U.S. Application Data

(60) Provisional application No. 60/725,545, filed on Oct. 11, 2005.

(51) Int. Cl.
*G06F 9/44* (2006.01)

(52) U.S. Cl. .................. 717/169; 717/170; 717/172

(58) Field of Classification Search .................. None
See application file for complete search history.

(56) References Cited

U.S. PATENT DOCUMENTS

| | | | |
|---|---|---|---|
| 5,790,856 A | 8/1998 | Lillich | |
| 6,009,274 A * | 12/1999 | Fletcher et al. | 717/173 |
| 6,189,145 B1 * | 2/2001 | Bellin et al. | 717/170 |
| 6,591,418 B2 * | 7/2003 | Bryan et al. | 717/177 |
| 6,907,603 B2 | 6/2005 | Scott | |
| 7,013,461 B2 * | 3/2006 | Hellerstein et al. | 717/177 |
| 7,073,172 B2 * | 7/2006 | Chamberlain | 717/169 |
| 7,080,371 B1 | 7/2006 | Arnaiz et al. | |
| 7,159,214 B2 * | 1/2007 | Rajaram et al. | 717/172 |
| 7,424,706 B2 * | 9/2008 | Ivanov et al. | 717/169 |
| 7,519,964 B1 * | 4/2009 | Islam et al. | 717/177 |
| 7,552,430 B2 | 6/2009 | Napier et al. | |
| 7,571,437 B2 * | 8/2009 | Tanno et al. | 717/172 |
| 7,620,948 B1 | 11/2009 | Rowe et al. | |
| 7,703,090 B2 | 4/2010 | Napier et al. | |
| 7,703,091 B1 | 4/2010 | Martin et al. | |
| 7,882,502 B2 * | 2/2011 | Kovachka-Dimitrova et al. | 717/169 |
| 7,984,434 B1 * | 7/2011 | Gathoo | 717/170 |
| 8,151,258 B2 * | 4/2012 | Russell et al. | 717/172 |
| 2003/0101445 A1 * | 5/2003 | Li et al. | 717/170 |
| 2003/0220992 A1 | 11/2003 | DiRico | |
| 2004/0167906 A1 * | 8/2004 | Smith et al. | 707/100 |
| 2004/0210653 A1 * | 10/2004 | Kanoor et al. | 709/223 |
| 2005/0097543 A1 | 5/2005 | Hirayama | |
| 2006/0253565 A1 * | 11/2006 | Doherty et al. | 709/223 |

OTHER PUBLICATIONS

Brykczynski et al, Reducing Internet-Based Intrusions: Effective Security Patch, IEEE Software, Jan./Feb. 2003, Retrieved on [May 16, 2012] Retrieved from the Internet: URL<http://ieeexplore.ieee.org/stamp/stamp.jsp?arnumber=01159029>.*

Brandman, George. Patching The Enterprise, Queue Magazine, Mar. 2005, pp. 32-39, Retrieved on [May 16, 2012] Retrieved from the Internet: URL<http://dl.acm.org/citation.cfm?id=1053344>.*

* cited by examiner

*Primary Examiner* — Thuy Dao
*Assistant Examiner* — Cheneca Smith
(74) *Attorney, Agent, or Firm* — Fliesler Meyer LLP

(57) ABSTRACT

Patch management system can be used for maintaining patches downloaded for software. The patch management system can ensure that there are no conflicts between the installed patches.

20 Claims, 40 Drawing Sheets

FIG. 18A

PATCH MANAGEMENT SYSTEM

CLAIM OF PRIORITY

This application claims priority to U.S. Provisional Application No. 60/725,545 entitled "Patch Management System" by David Felts, filed Oct. 11, 2005 and hereby incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF INVENTION

The present invention relates to patch management systems. Especially to patch management systems to download, store and apply patches for software.

Patch management systems can be used to control the downloading and updating of computer software. The patch management system can interact with a central location using the Internet to download of patches for the computer software.

BRIEF DESCRIPTION OF THE DRAWINGS

Figure 18A:
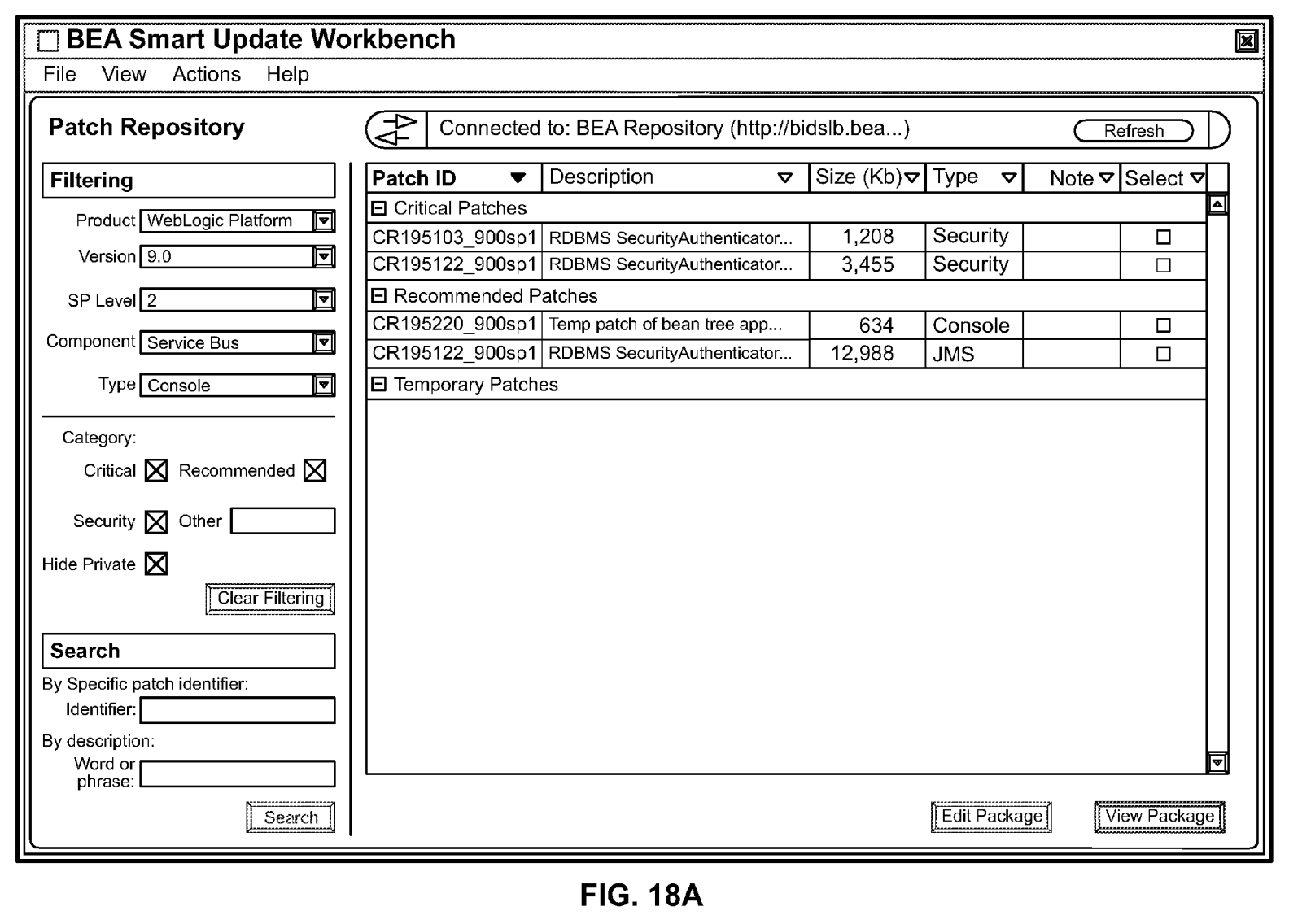

FIGS. 18A-F illustrate additional graphical user interface displays for a system of one embodiment.

DETAILED DESCRIPTION

Figure 1A:
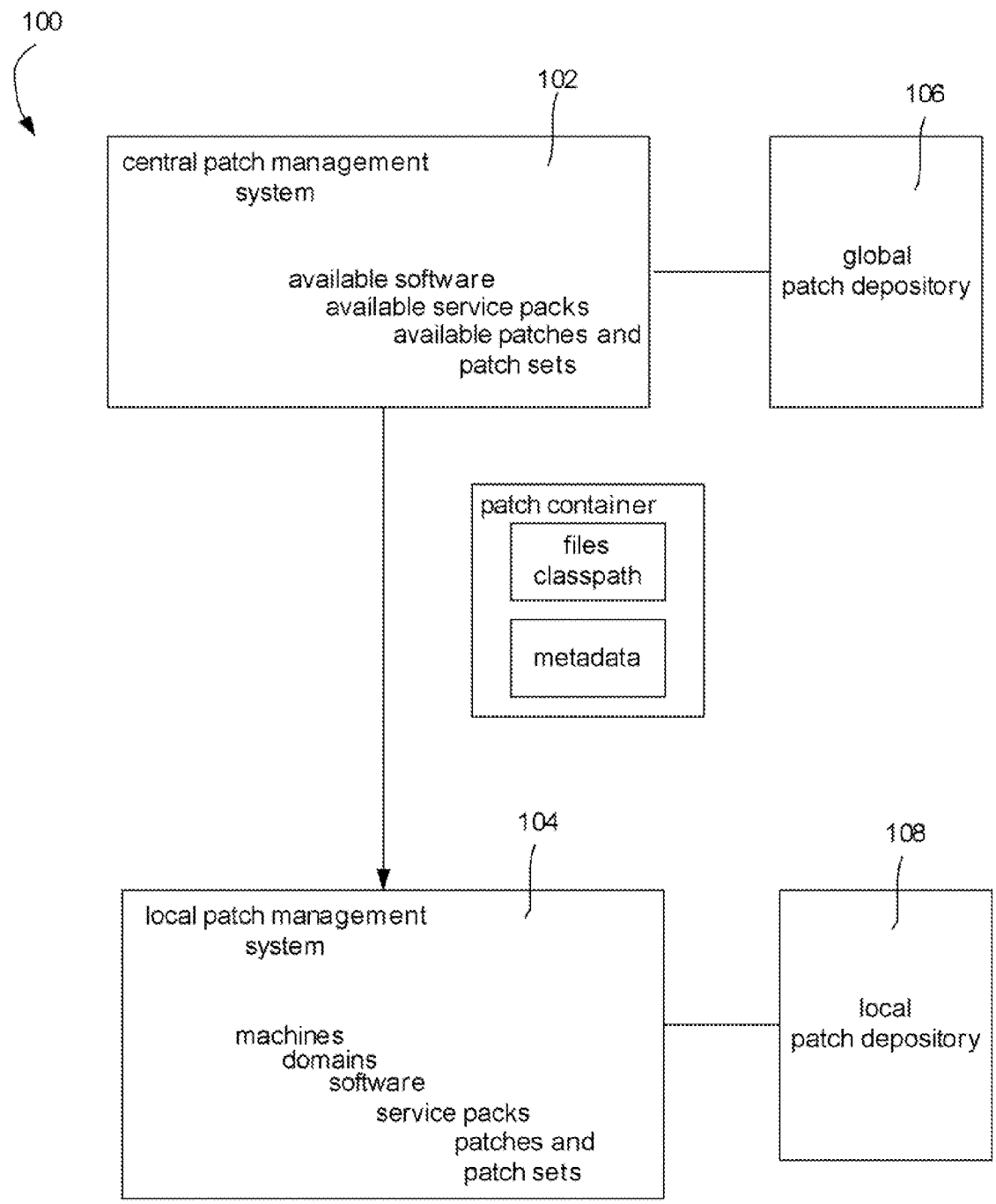
FIG. 1A shows a patch management system of one embodiment.

FIG. 1A shows a patch management system 100 which can include a patch management unit 102 at a central location, such as a website accessible on the Internet and a local patch management system 104. The local patch management system 104 can search for available patches from a central location 102. The available patches can be associated with software that is running on a local system.

In one embodiment, the central location 102 can have a global patch depository 106 that can store the different available patches. The local version of the patch management system 104 can have a local patch depository 108 that can store all of the downloaded patches.

The patches can be packaged to contain the patch software, files, class loading information, as well as, metadata that can be used to determine the dependencies and other information for checking whether patches can be applied with respect to previous patches installed in a configuration. The metadata can also include information such that the local patch management system 104 can rollback patches.

In one embodiment, the local patch management system 104 can be used to store and apply patches for at least one software program. The patch management system can maintain multiple applied patch configurations for the same software program for the same machine.

Figure 1B:
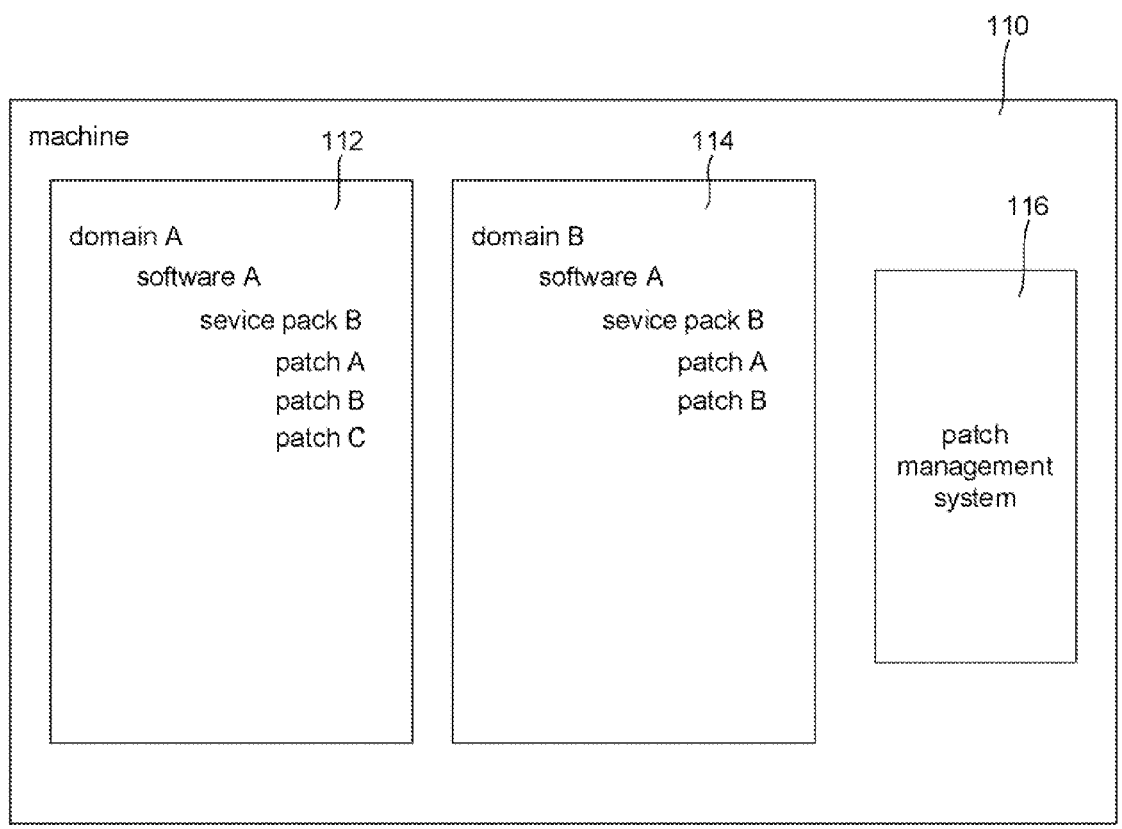
FIG. 1B shows the operation of a patch management system on a machine with multiple domains.

FIG. 1B shows a machine 110 with two different domains: domain 112 and domain 114. In domain 112, software A has installed patches A, B and C. In domain 114, software A has installed patches A and B. In one example, when the software A is run for domain 112, patches A, B and C are loaded as well. When software A is run for domain B, software A runs with patches A and B, but does not run with patch C. The patch management system 116 can be used to ensure the compatibility of the patches in the domains. In one embodiment, one of the domains can be a test environment and the other domain can be a production environment.

The software program can be an application server program, such as the WebLogic Server™, available from BEA Systems, Inc., of San Jose, Calif. The patch management system can maintain patch configurations for multiple different software programs. A patch management system can include a graphical interface which can allow the user to manage and search for patches and like. The graphical interface can have screens showing the available patches, which can be generated using data obtained from the central location as well as screens of applied patch data. In one embodiment, the patch management system can allow a rollback of a patch without requiring the software program to be reinstalled. This can have the advantage that the software need not go down to rollback a patch. The patch management system can maintain indications of files and class patch from previously patches which can allow for an easy rollback.

The patches can depend upon the service pack such that the installation of a new service pack, removes the old patches. FIG. 1B shows an example where both domain A and domain B have a service patch B loaded on. The service pack can have a higher level of testing and reliability associated with it. By keeping the patches dependent upon a service pack, this can ensure that many of the changes can be part of the service pack which has a higher reliability. It is also possible for the software have not associated service pack.

In one embodiment, the patch management system can do dependency checking to determine whether a patch can be applied to the previously applied patch. This conflict checking can use the metadata associated with the patch container. In one embodiment, the patch management system can connect to a server using the internet to obtain patches.

One embodiment of the present invention is a patch management system to store and apply patches for at least one software program. The patch management system adapted to maintain multiple applied patch configurations for the same software and the same machine. The patch management system can include a graphical interface, which can allow for selecting whether a patch is to be applied to the entire machine or to a specific domain. The graphic interface can allow the display of applied and available patches for each domain.

Figure 1C:
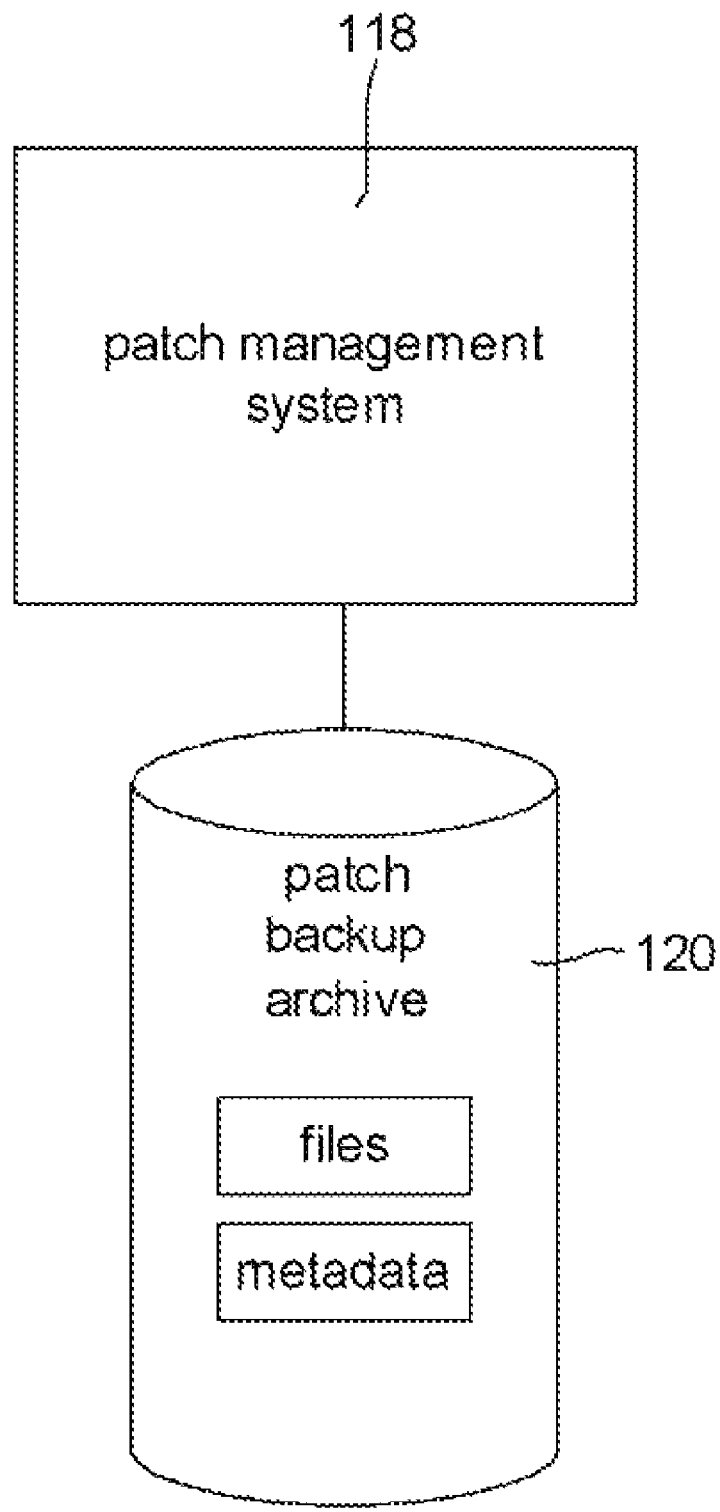
FIG. 1C illustrates a patch management system with a patch backup container.

One embodiment of the present invention is a patch management system to store applied patches for at least one software program. The patch management system can keep track of files and class paths modified, such that the patches can be rolled back. In one embodiment, as shown in FIG. 1C, the patch management system 118 maintains a patch backup container 120. The patch backup container 120 can be an archive file, which can contain metadata indicating the how file versions are to be restored when patches are selected for removal.

In one embodiment, the patch management system can store patches for at least one software program. The patch management system can be adapted to apply patches and service packs to the software program. The patches can depend upon the last installed service pack, such that the installation of a new service pack can remove the old applied patches.

Figure 1D:
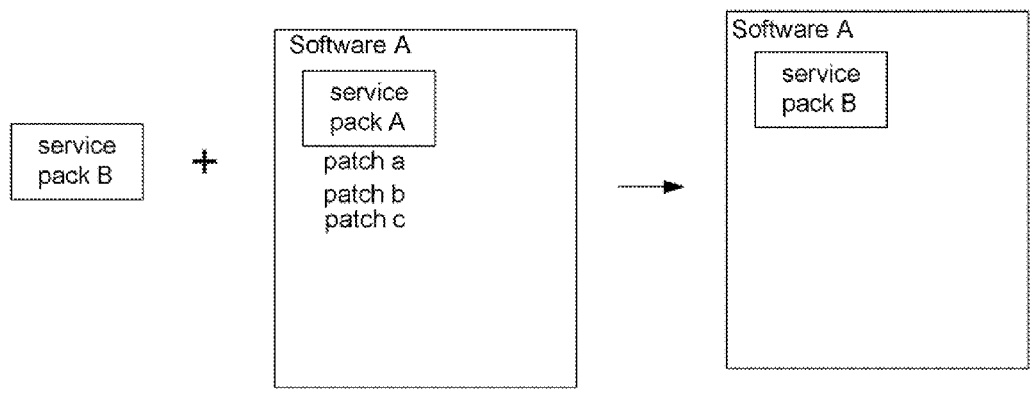
FIG. 1D illustrates the change in a configuration when a new service pack is applied in one embodiment.

FIG. 1D illustrates an example where the configuration before and after a service pack B is applied. The operation of FIG. 1D can be implemented by either by reinstalling the software with service patch B, or by uninstalling patches A, B, and C as well as service pack A and then installing service patch B.

One embodiment of the present invention is a patch management system to store and apply patches for at least one software program. The patch management system can be adapted to apply a patchset to a software program. The patchset can include a number of patches and metadata indicating the order of the patches are to be applied, where the patch management system is configured to apply the patches in the order indicated by the metadata.

The use of patchsets can allow the system to combine a number of patches at the same time. Patches which have been determined to be useful and/or related can be combined together to reduce the user difficulty of adding the patches. For example, if a patch set include five patches, the patch management system can allow a single patch that contain these five patches to be downloaded and installed rather than requiring the downloading and installing of five different patches.

Figure 1E:
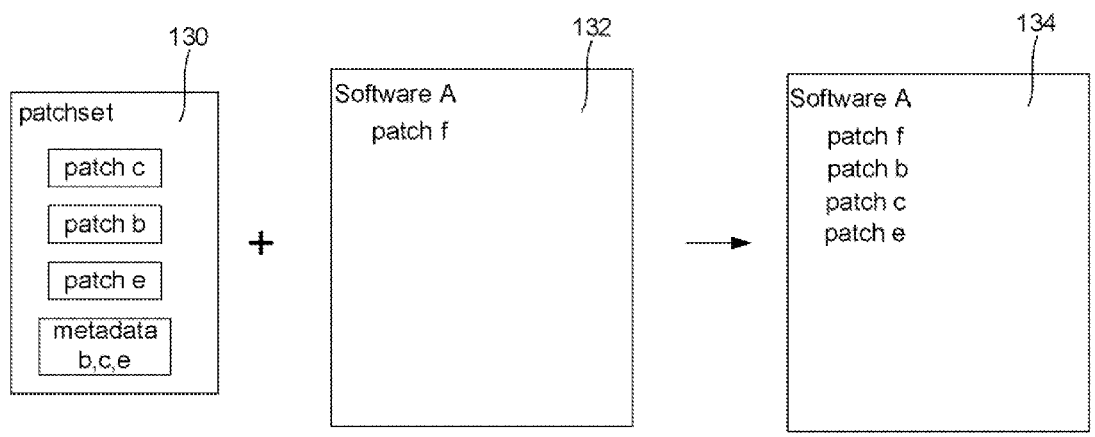
FIG. 1E illustrates the application of a patchset to a configuration in one embodiment.

FIG. 1E illustrates an example of a patchset 130 that includes patches C, B and E as well as metadata 132 that indicates the order that the patches should be applied. This patchset 130 can be applied to a configuration, such as configuration 132 to produce an updated configuration 134. Note that in addition to the metadata indicating the order that the patches are to be applied, metadata associated with each of the patches can indicate when the patch can be applied or when it would conflict with other patches. This metadata can be examined to determine whether there are any conflicts.

In one embodiment, a patch management system applies and removes patches to a software program. The patch management system can keep track of applied patches as well as the order that the applied patches were applied. The patch management system can store information that allows restoration of elements superceded by the removed patches. In one embodiment, as shown in FIG. 1C, the patch management system 118 can have a patch backup archive 120 that can keep track of different files for the patches as well as the metadata indicating which files need to be used when a patch is removed. In one embodiment, the patch management system maintains a patch backup archive including multiple versions of files from the different applied patches and metadata indicating that order of the patches.

Figure 2:
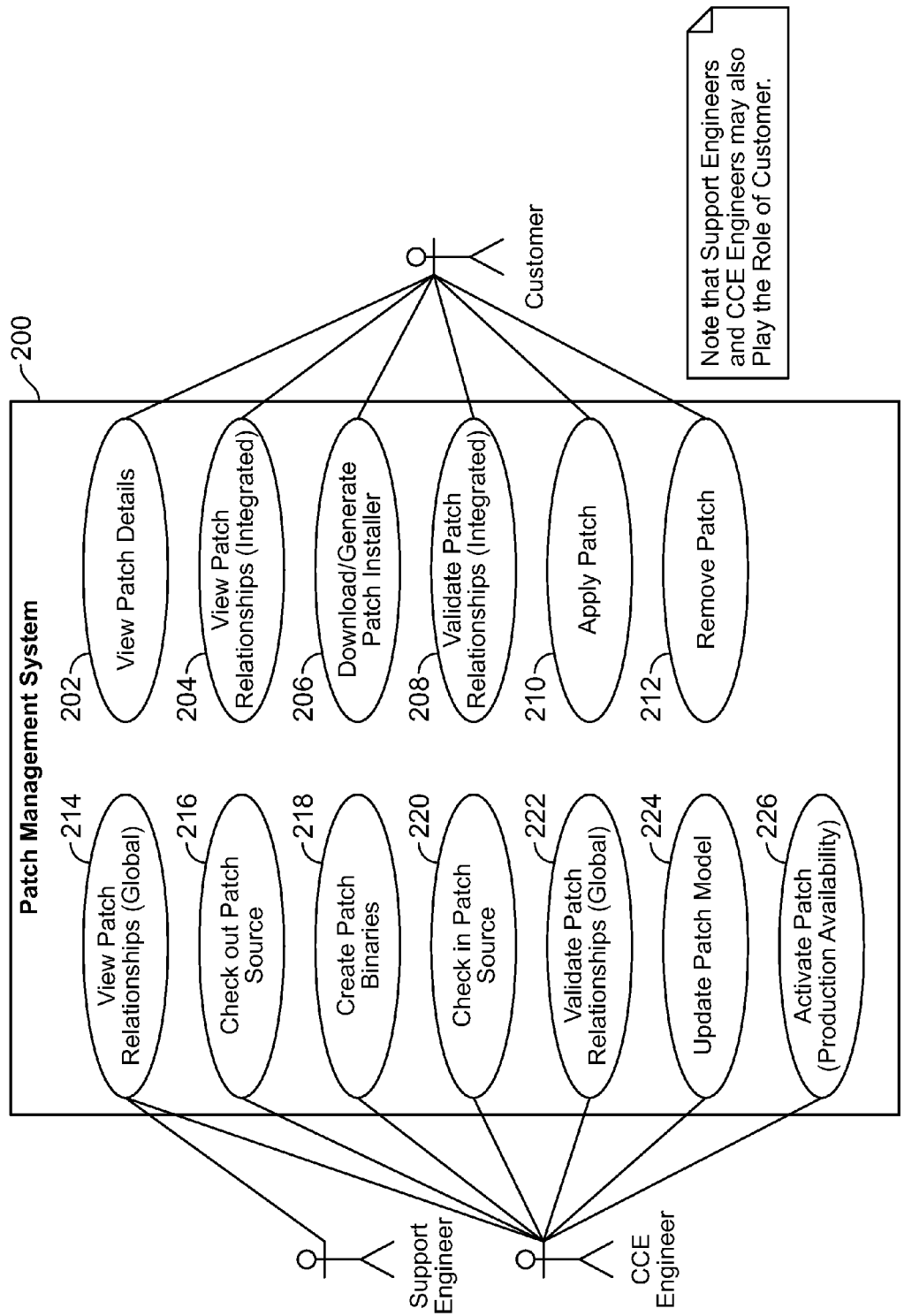
FIG. 2 illustrates one example of a patch management system 200 of an exemplary embodiment.

FIG. 2 illustrates one example of a patch management system 200 of an exemplary embodiment. In this example, a customer is able to use the patch management system to view patch details 202, view patch relationships 204, such as seeing how different patches are related with potential conflict with the other patches, download and generate a patch installer 206. The patch installer can be the local version of the patch management system. Downloading patch relationships steps 208, can be done before the patch is applied. The customer can also apply patches 210 and remove patches 213. Support engineers can view patch relationship 214 indicating the relationship of all of the potential patches. The support engineer can check out the patch source 216, trace binaries 218, check patch source 220, validate patch relationships 222, to make sure to indicate the two different patches are related to each other, update the patch model 224 and activate patches 226 to make the patches available to the user. Not all of these functions are required for the patch management system.

Figure 3:
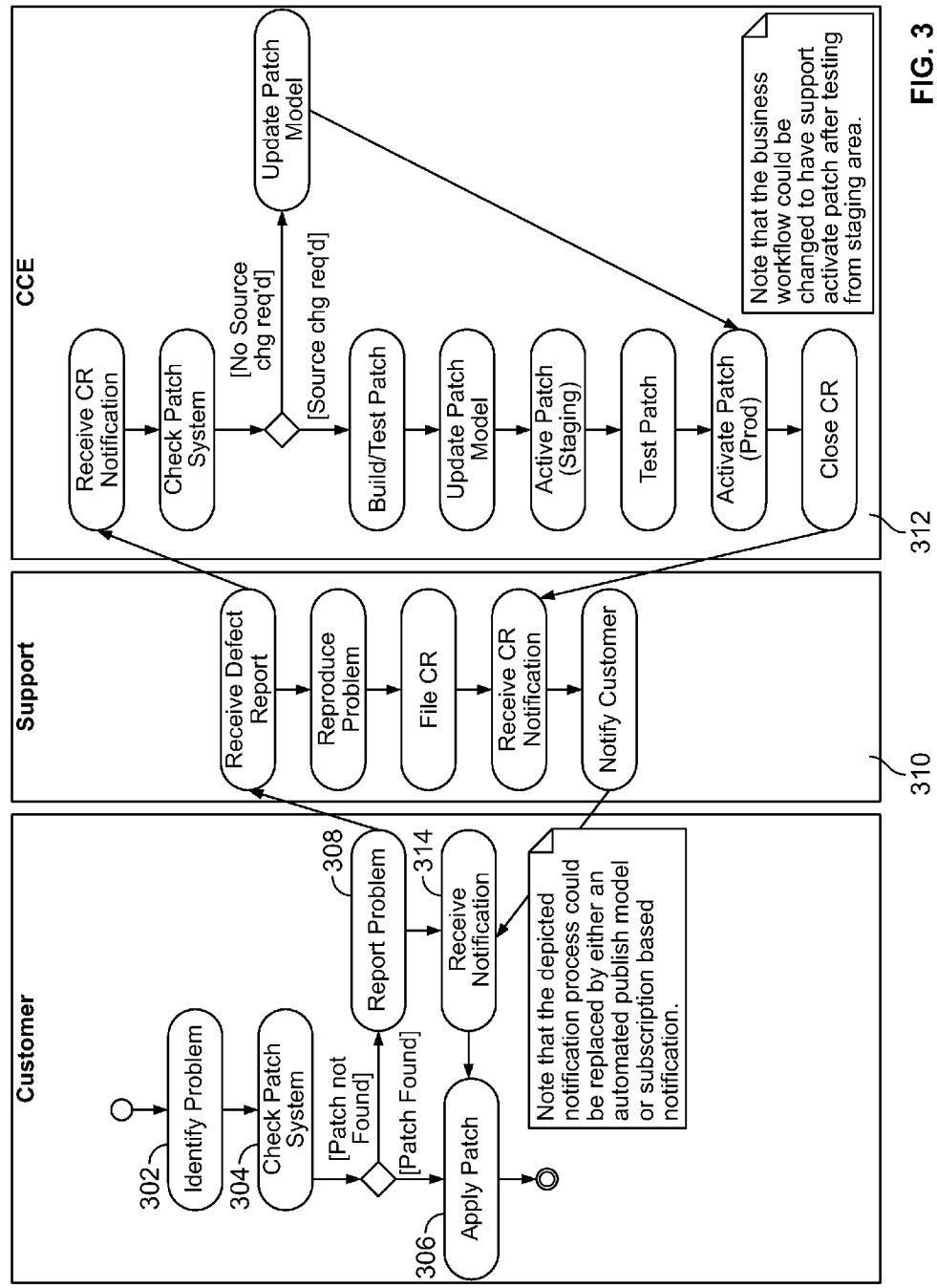
FIG. 3 illustrates a flow chart of one embodiment of the use of a patch management system.

FIG. 3 illustrates a flow chart of one embodiment of the use of a patch management system. In step 302, a problem is identified. In step 304, the patch system is checked. If a patch is found, the customer can apply a patch in step 306. If not, the user can request a patch in step 308. A series of steps can be done by the support 310 and the additional engineering 312 which can result in the customer being indicated of a new patch 314 that can be applied in step 306. The example of FIG. 3 is merely exemplary, is not meant to limit the present invention.

Figure 4:
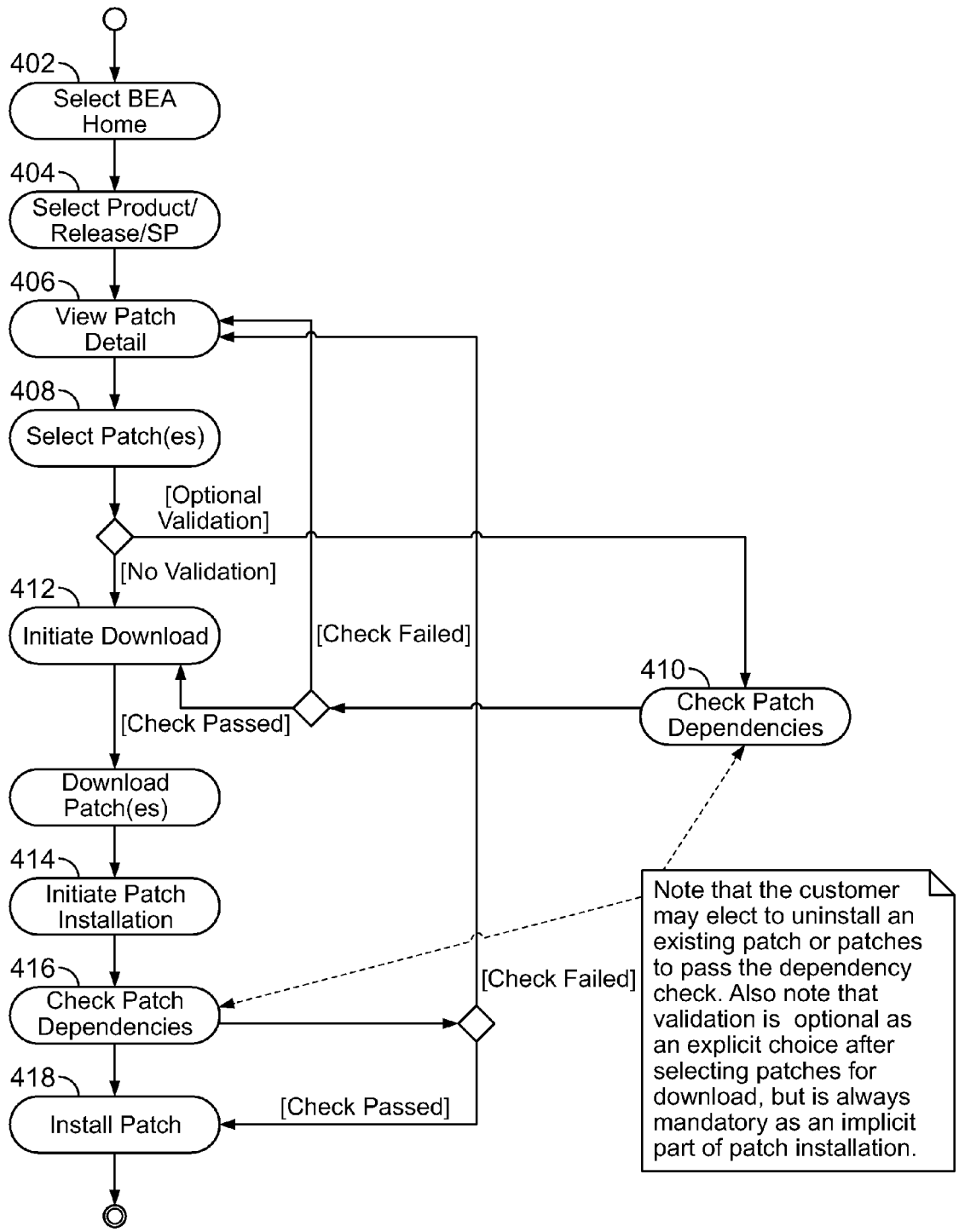
FIG. 4 illustrates an exemplary activity diagram for a simple customer patch installation.

FIG. 4 illustrates an exemplary activity diagram for a simple customer patch installation. In step 402, the customer goes to the website of the software suppler. In step 404, the user can include the current products/release or service pack. In step 406, the user can check the patch details. The patch can be selected, in step 408. There can be optional validation at this point, in which case the patch dependencies can be checked in step 410. Examples of a patch dependency check are described below. If the patch dependencies check out or if there is no validation, in step 412, a download of the patches can be initiated. In step 414, the patch installation can be started. The patch installation can include an additional check of the patch dependencies, and if the patch passes the check, the patches can be installed in step 418.

Figure 5A:
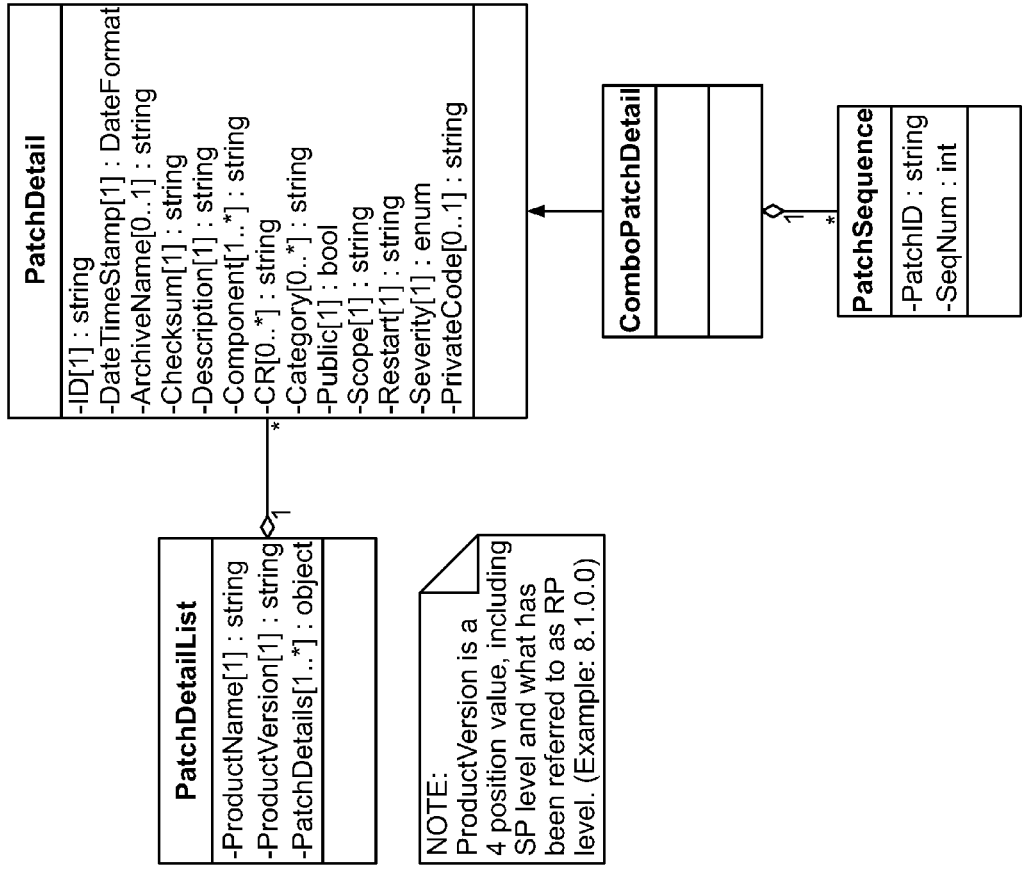
FIGS. 5-8 illustrate exemplary patch data models of one embodiment
Figure 5B:
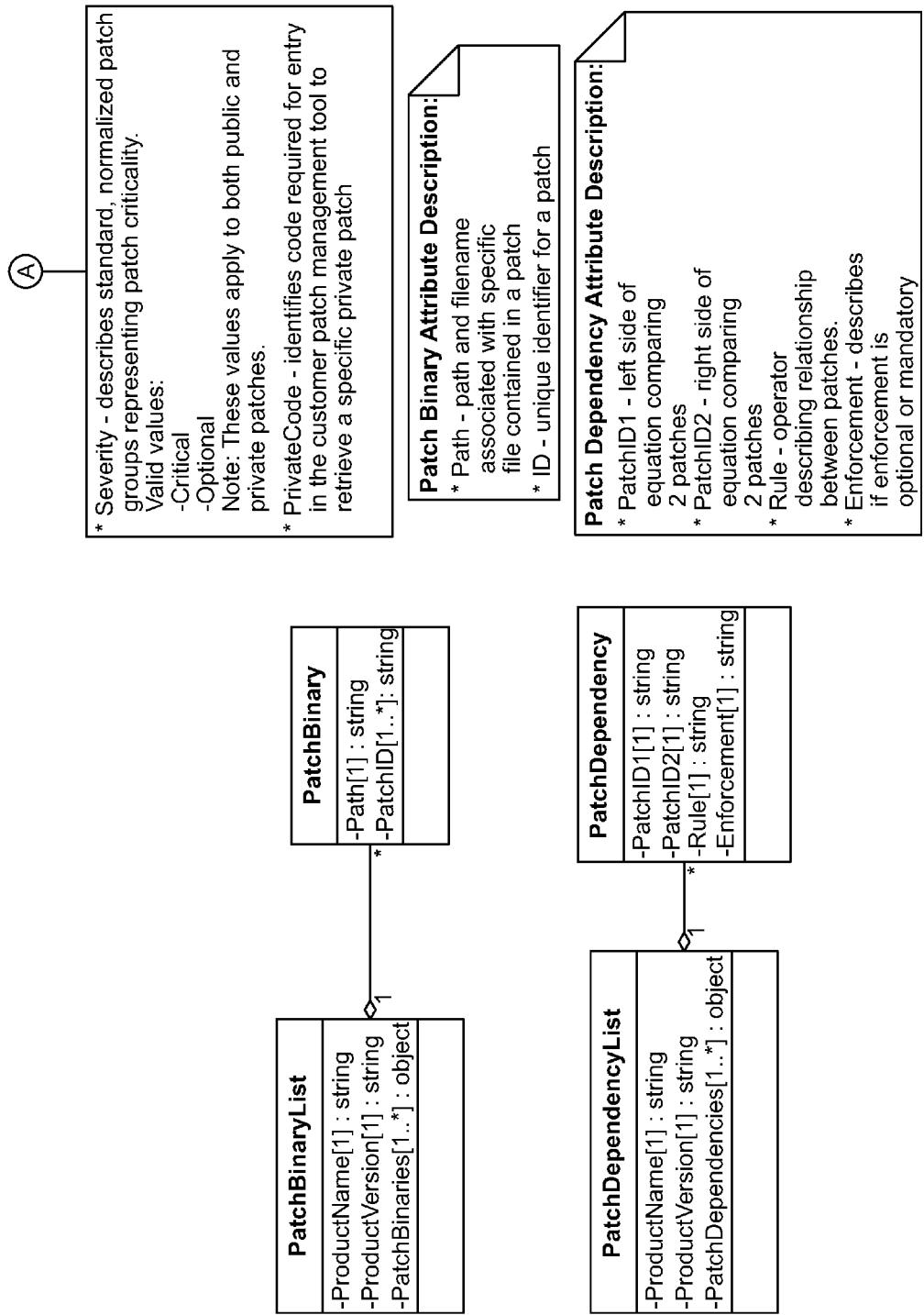
Figure 6:
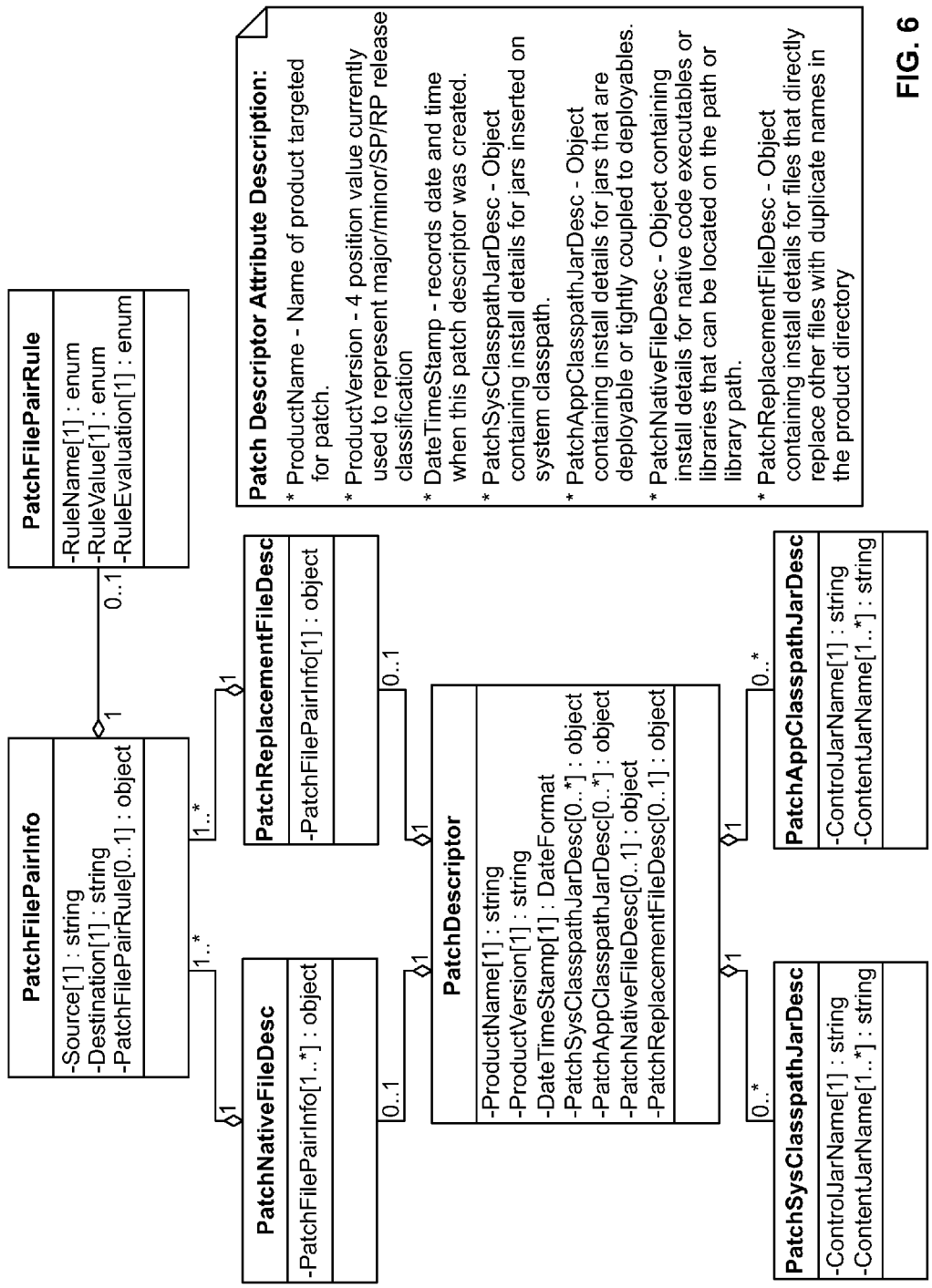
Figure 7:
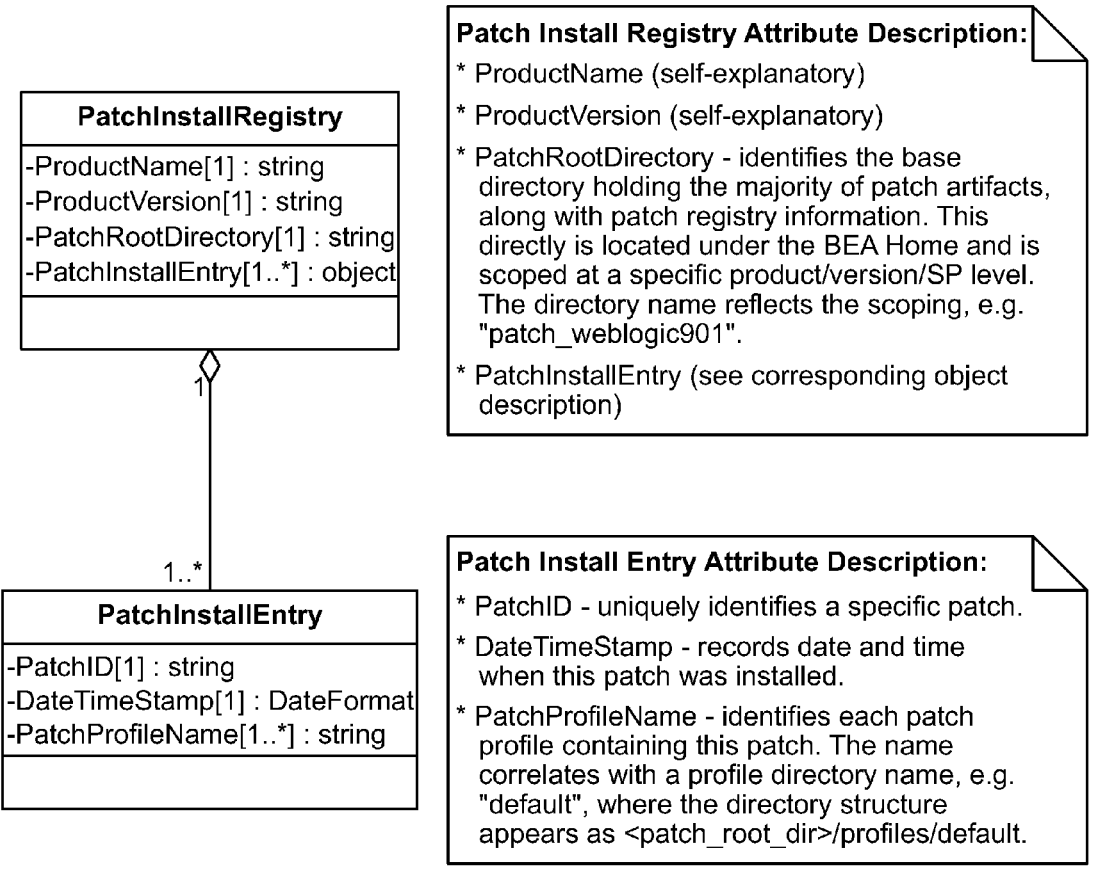
Figure 8:
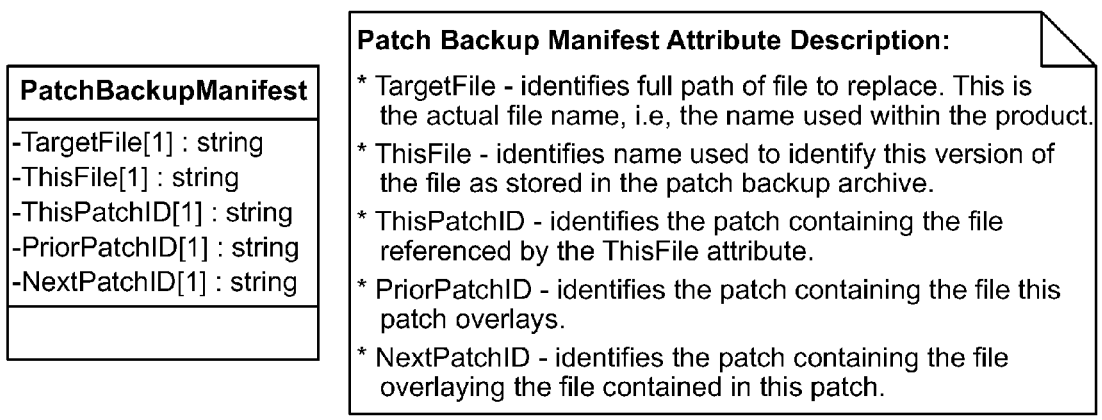

FIGS. 5-8 illustrate exemplary patch data models of one embodiment. FIG. 5 illustrates an exemplary data model for the patch management system. In this example, the patch detail can include a patch ID, date time stamp, archive name, checksum used to check the integrity of the patch, description, component information, change request information so that the patch can be associated with a change request, category, which can indicate a grouping or type of the patch and information whether the patch is public or private. Scope information can indicate whether the patch is product scoped, domain scoped or mixed scoped. For example, a patch with the product scope would need to be applied to all of the software for a given machine. A patch with the domain scope would need to be applied to a single domain, a patch with the mixed scope can be applied to either the machine or domain. Restart indicates whether a restart is required to add the patch. Severity indicates the criticality of the patch. A private code can be required to be entered into the customer patch management tool to retrieve a specific private patch. This private patch ID can be different from the patch ID.

A combo patch detail can be used to indicate the patchsets. The patch sequence information indicates the different patches as well as the sequence number which the patches are to be applied. Additional metadata can include the patch dependencies. In one embodiment, the patch dependencies list for each version of the software indicates a product name, product version and a number of objects which indicate the patch dependencies. The objects can indicate the patches that have a dependency, the dependency rule, and the enforcement mechanism for the rule. For example, the patch can be optional or required. In one example, the patch dependencies rule is an operated indicates the dependency relationship between the patches. In one embodiment, in the step below, there are four different types of dependencies.

FIGS. 9-12 illustrates the different type of dependencies.

Figure 9:
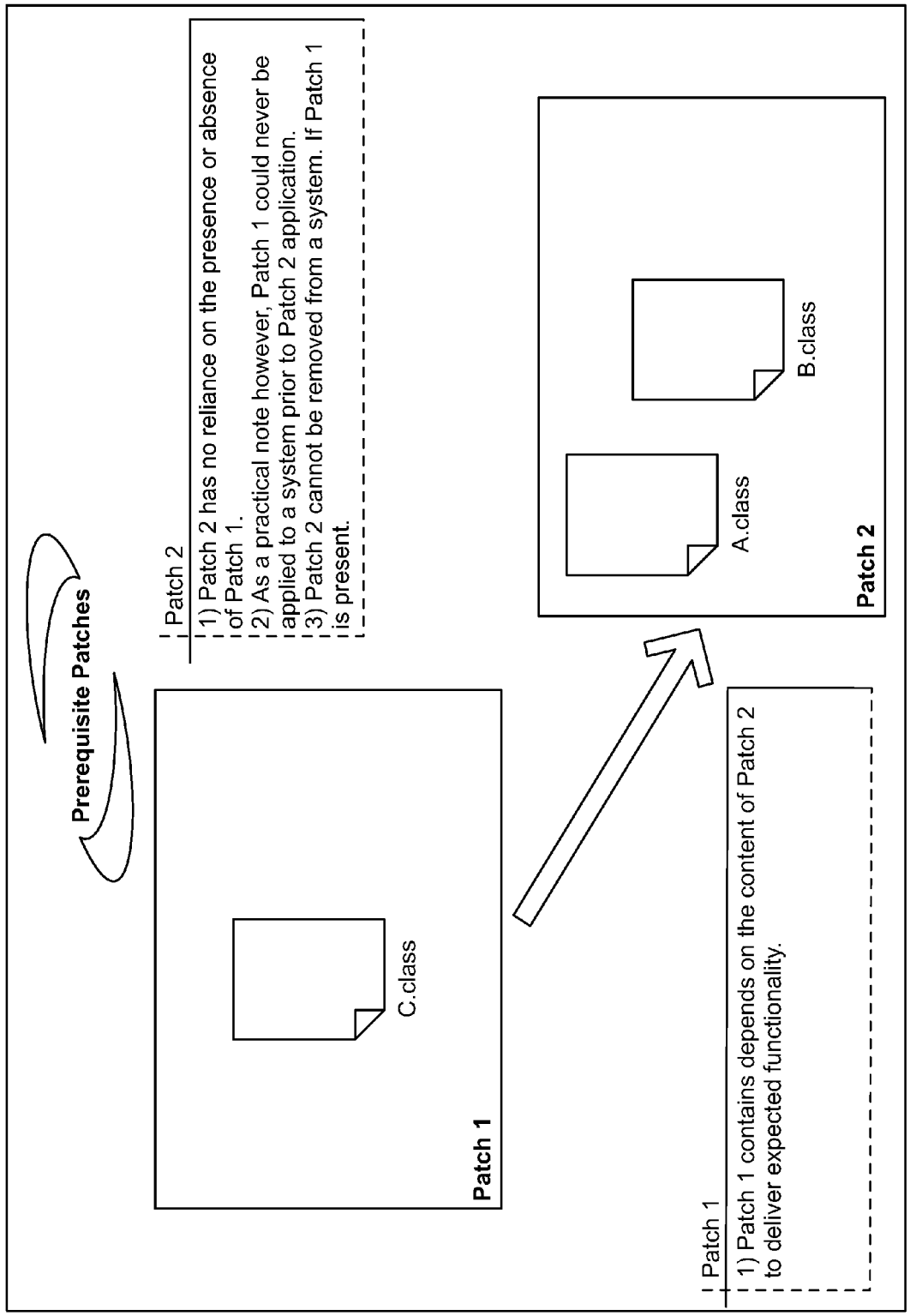
FIGS. 9-12 illustrates different types of dependencies.

FIG. 9 illustrates an example in which patch 1 is a prerequisite for patch 2. This means that patch 2 cannot be loaded unless patch 1 is already loaded. The system can make sure that, if a user wants to load patch 2, patch 1 has previously been loaded.

Figure 10:
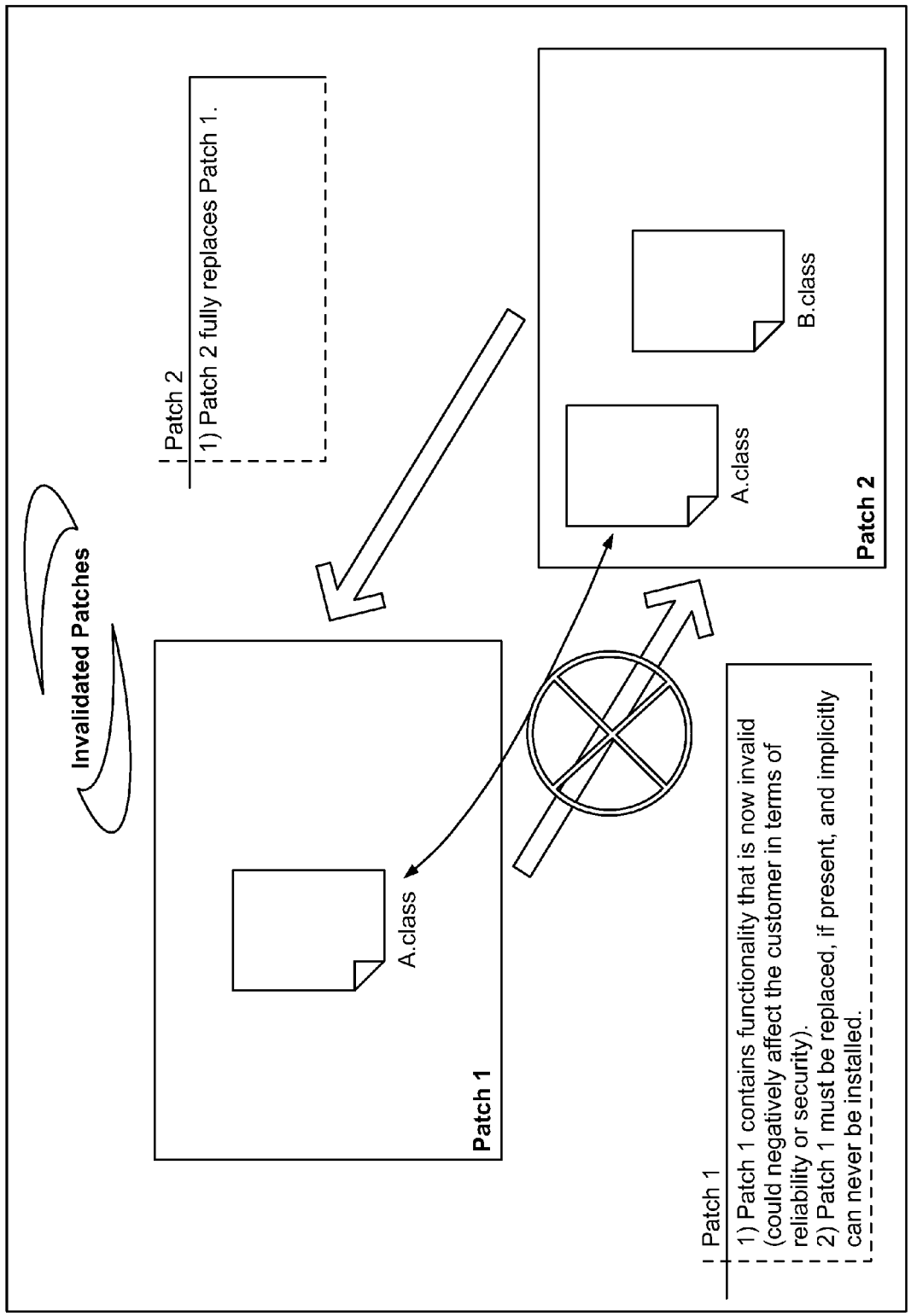

FIG. 10 illustrates the example of the invalidated patch. In this example, patch 2 fully replaces patch 1. Patch 1 contains functionality that is invalid and thus patch 1 must be replaced if present, and not be reinstalled.

Figure 11:
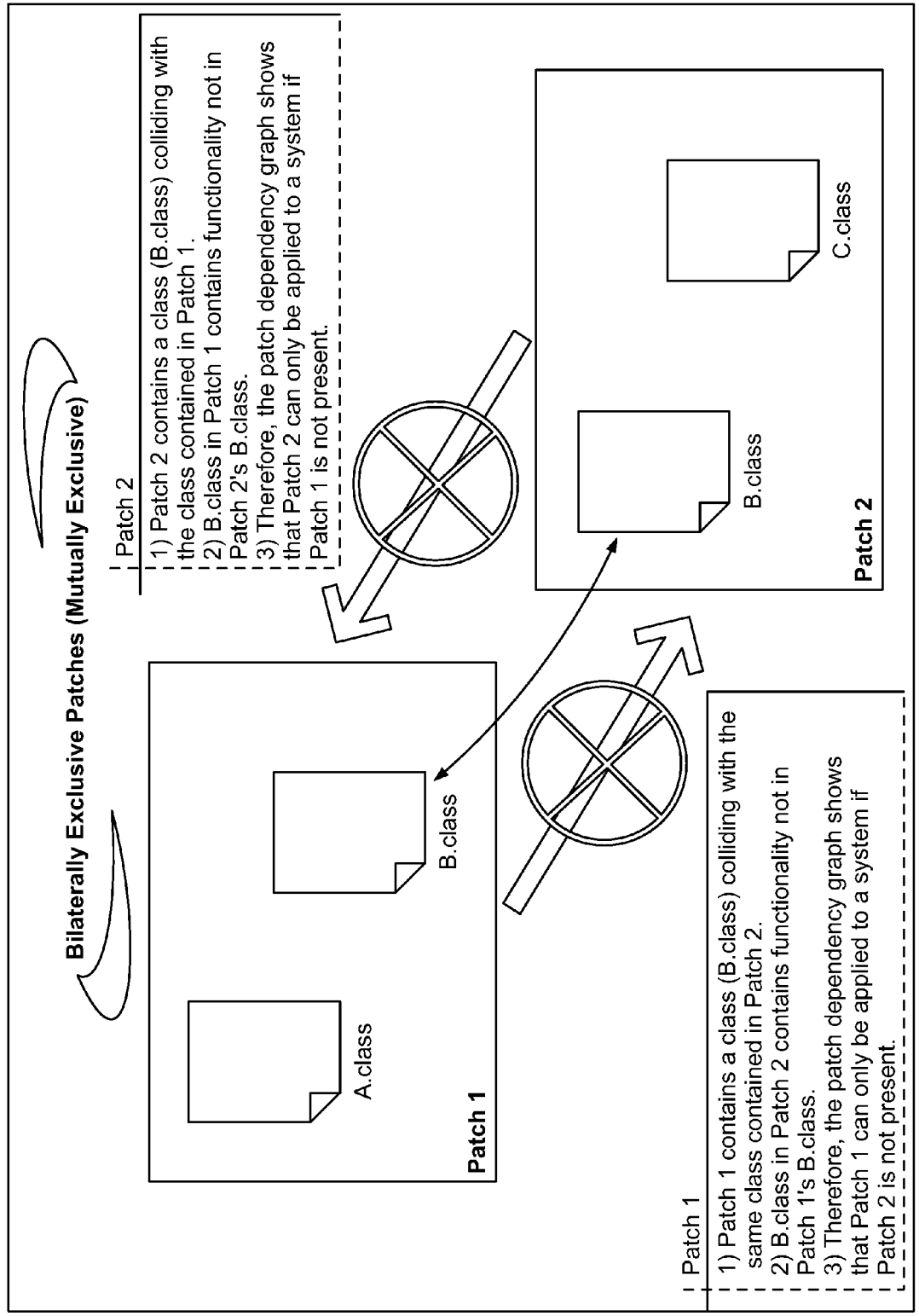

FIG. 11 illustrates bilaterally exclusive patches. In this example, if patch 1 is loaded then patch 2 can't be loaded and if patch 2 is loaded, patch 1 can't be loaded.

Figure 12:
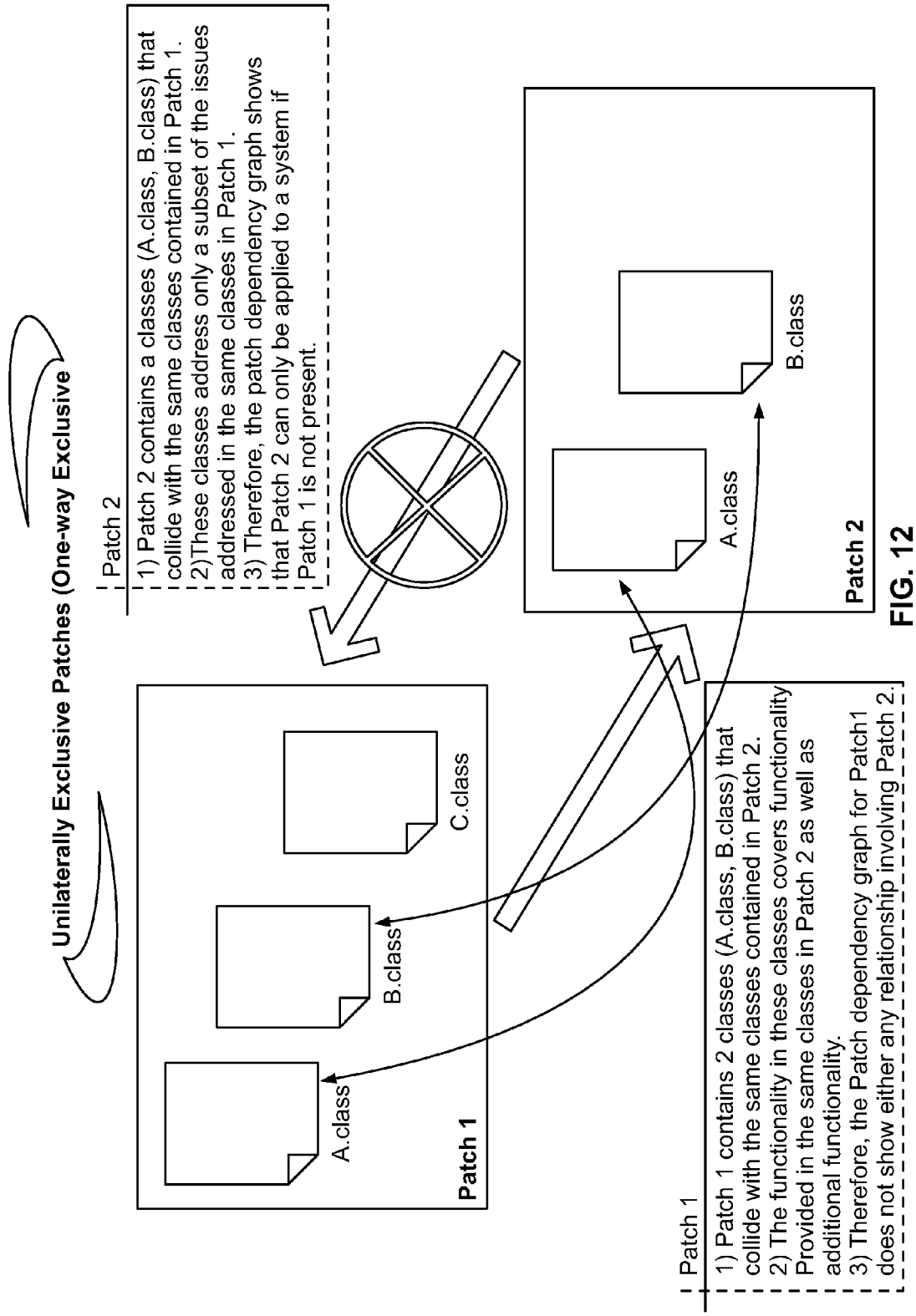

FIG. 12 illustrates an example of unilateral exclusive patches. In this example patch 2 cannot be applied if patch 1 is present. However, it is not bilaterally exclusive since patch 1 can be applied if patch 2 is present.

Figure 13:
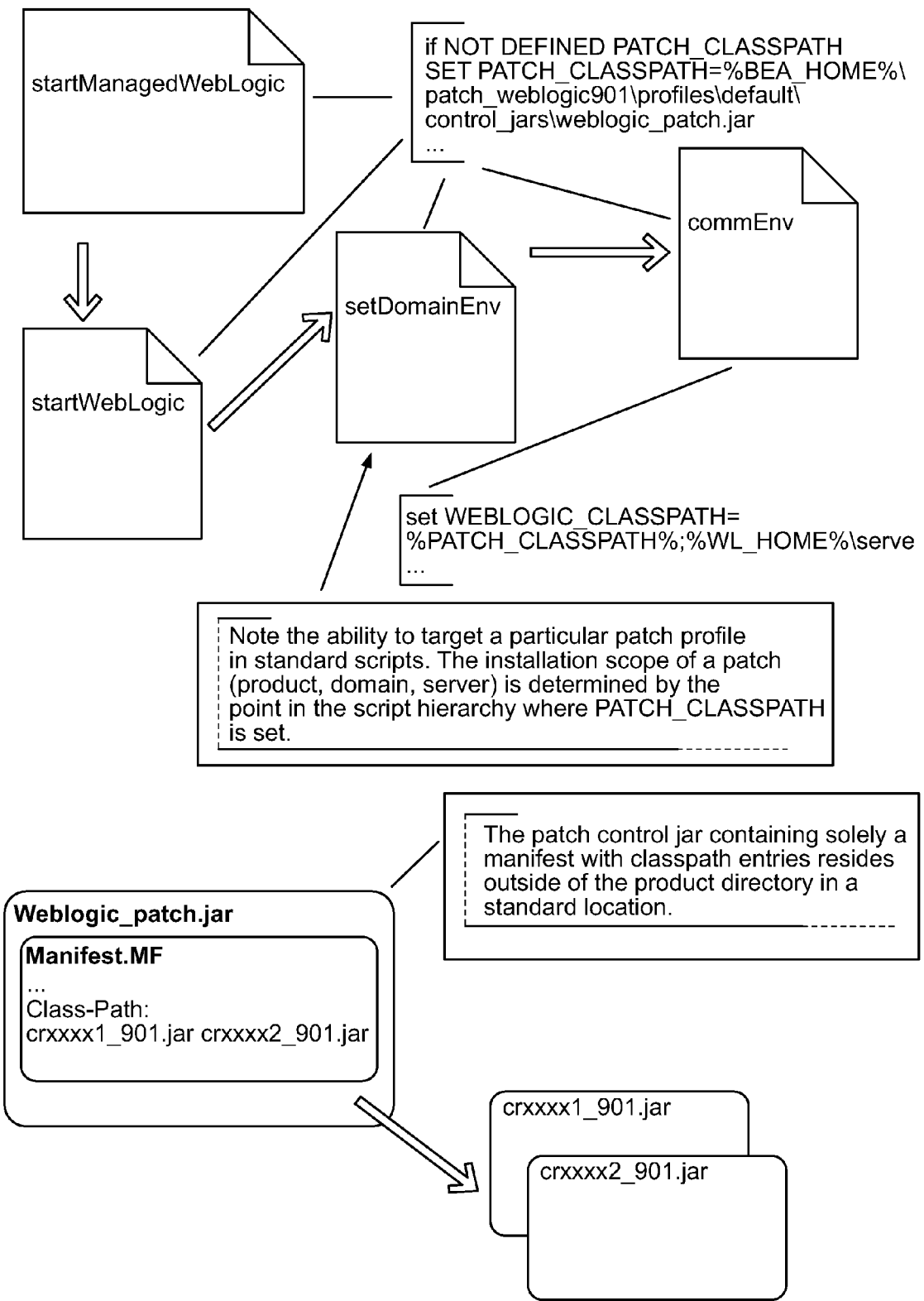
FIG. 13 is a functional view of server level patches of one embodiment.

FIG. 13 is a functional view of server level patches of one embodiment.

Figure 14:
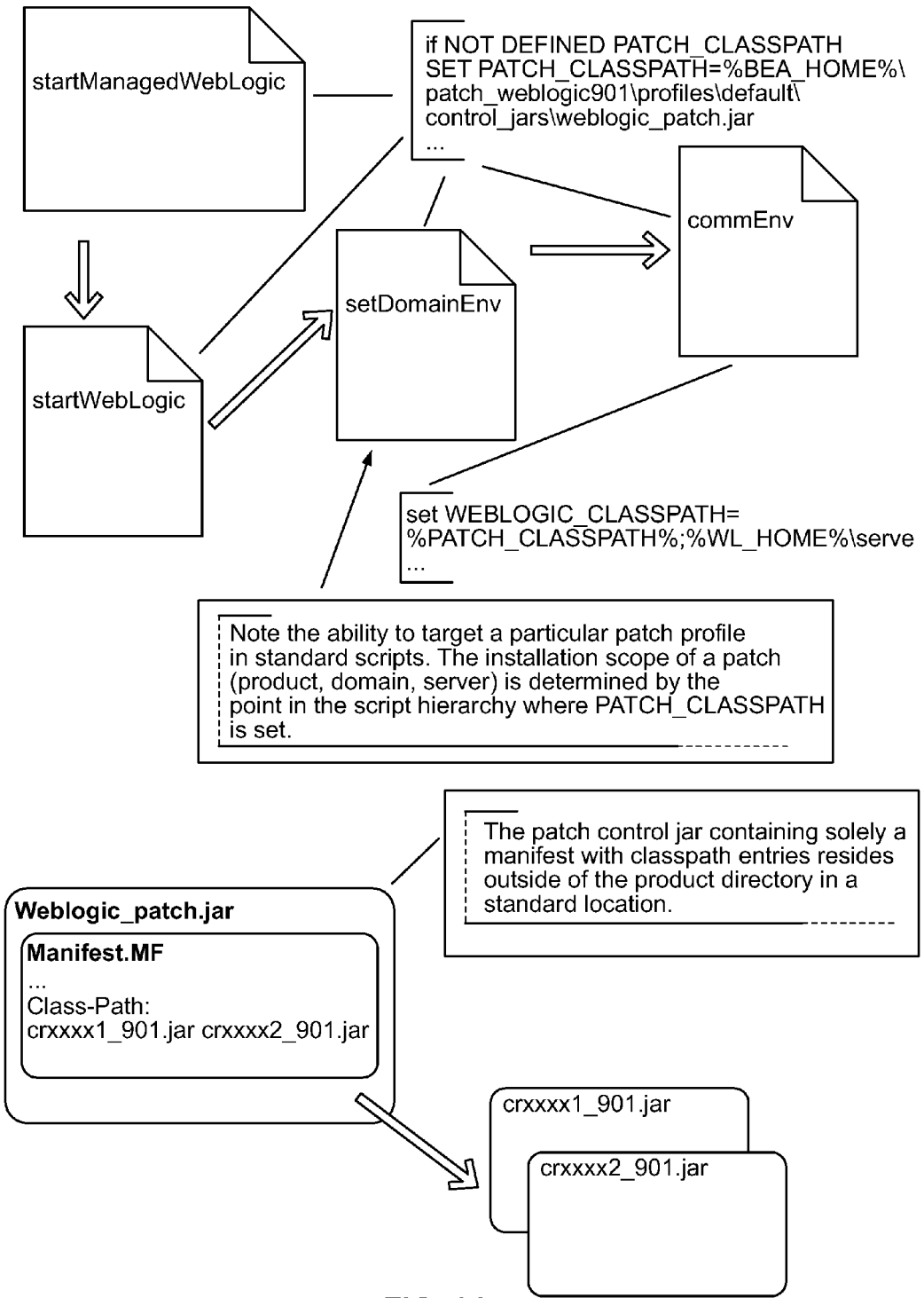
FIG. 14 is a functional view of application level patches of one embodiment.

FIG. 14 is a functional view of application level patches of one embodiment.

Figure 15:
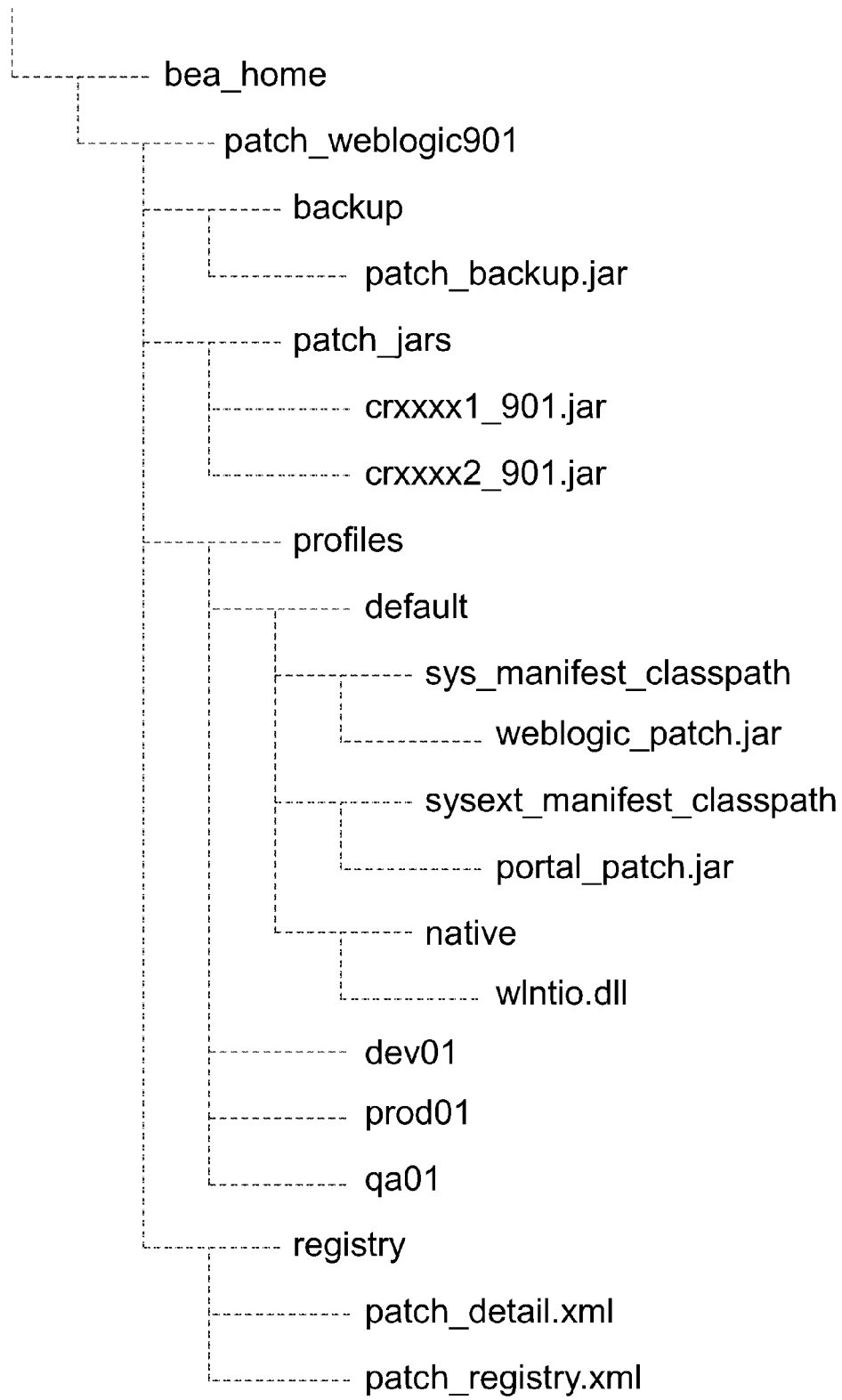
FIG. 15 illustrates a directory structure view of one embodiment of the system that can be used with the patch management system.

FIG. 15 illustrates a directory structure view of one embodiment of the system that can be used with the patch management system.

Figure 16A:
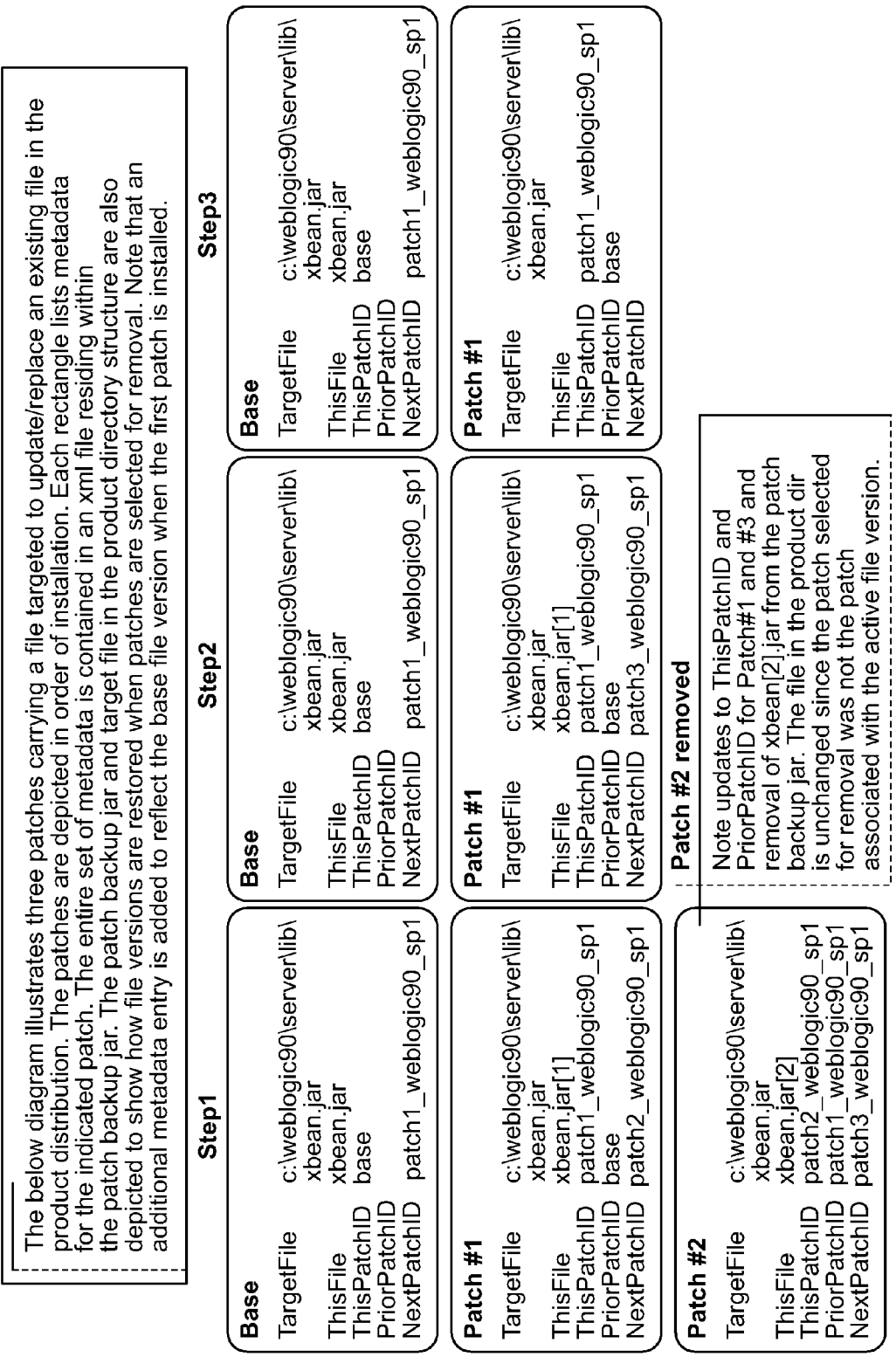
FIG. 16 illustrates an operation of a patch removal process of one embodiment.
Figure 16B:
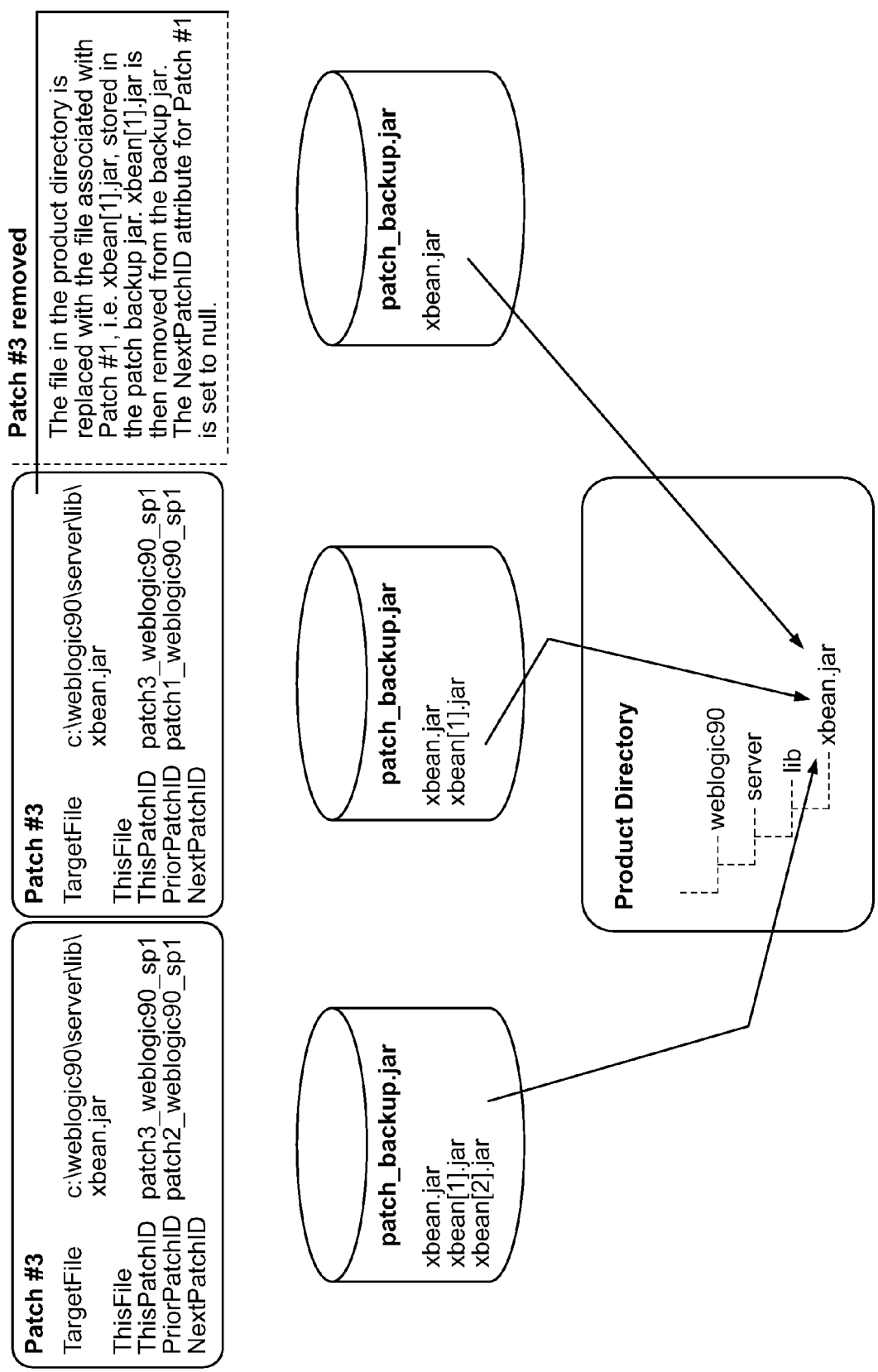

FIG. 16 illustrates an operation of a patch removal process of one embodiment. In FIG. 16 three different steps are shown. In step 1, the base files along with the patches 1, 2 and 3 are shown. The patch backup indicates versions of files which may be needed if a patch is rolled back. In step 2, patch 2 is removed. In one example, the metadata of patch 3 is updated. The patches can be stored in a linked list such that patch 3 is updated to indicate that it is now on top of patch 1 rather than patch 2. In this example, the file in the product directory drawer has not been changed since the roll back patches selected are not associated with the current file version. In step 3, patch 3 is removed and now the file in the file directory is replaced with a file associated with patch 1, which is restored in the patch backup archive.

Figure 17A:
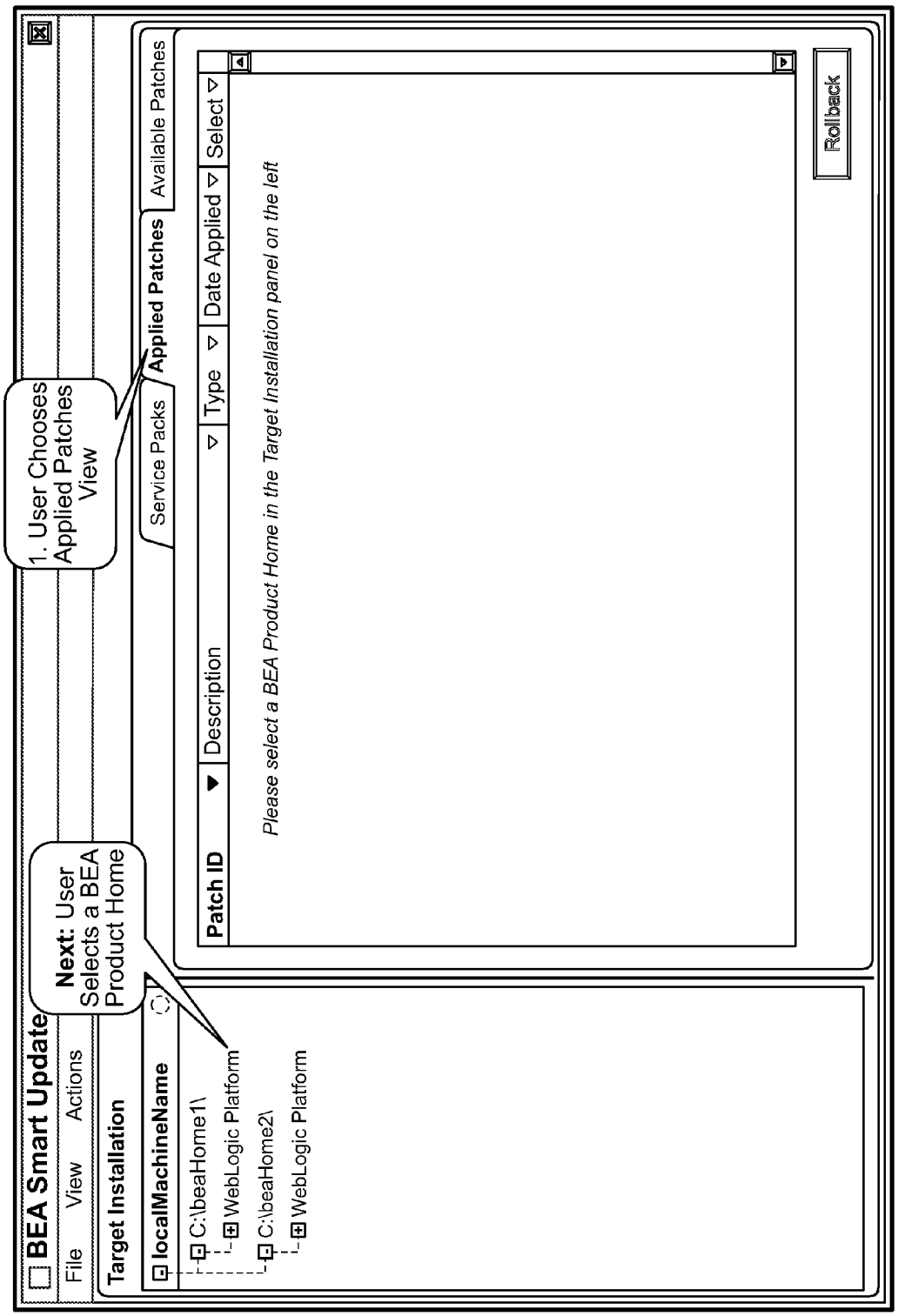
FIGS. 17A-N illustrate exemplary graphical user interface displays for a local patch management screen of one embodiment.
Figure 17B:
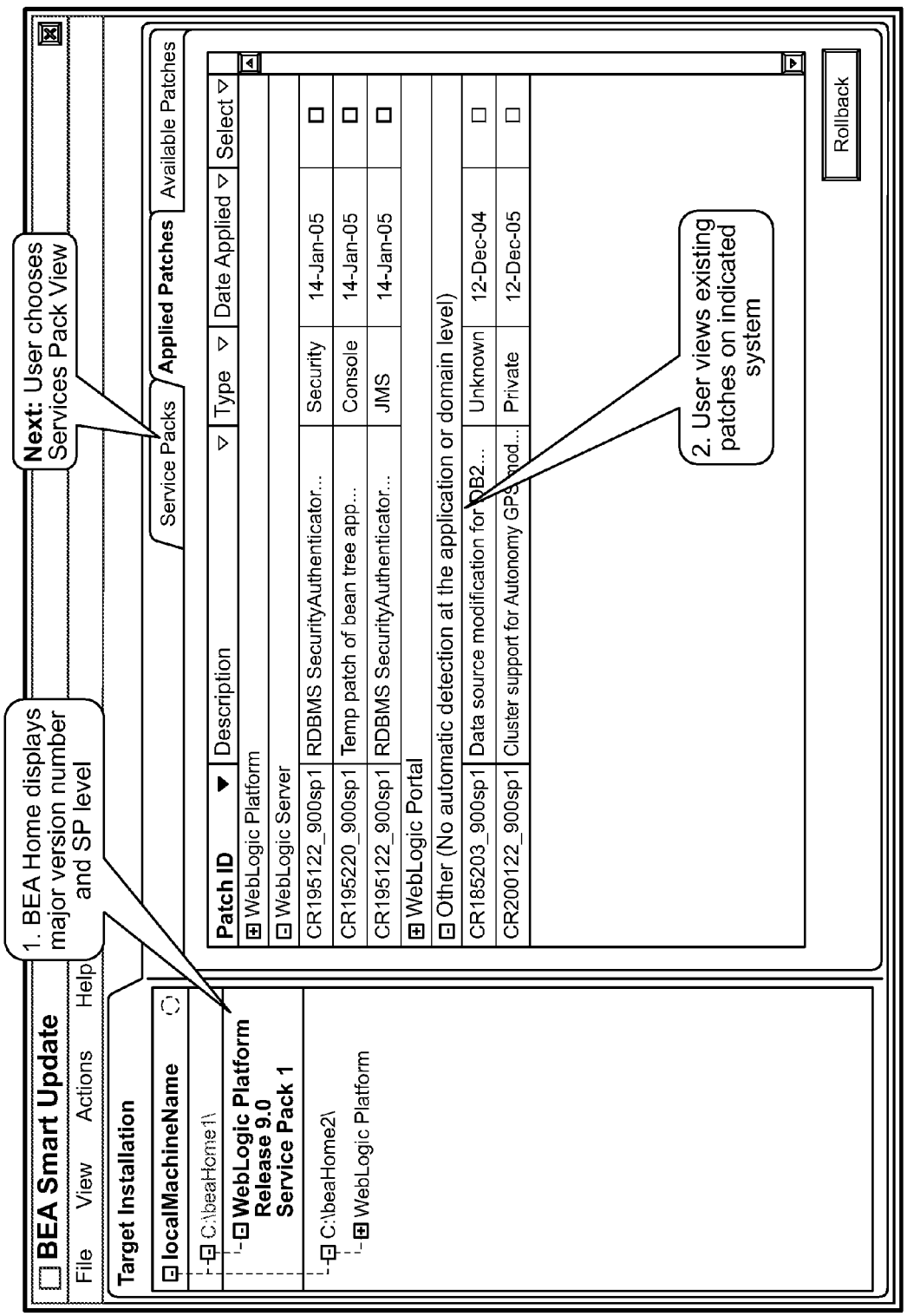
Figure 17C:
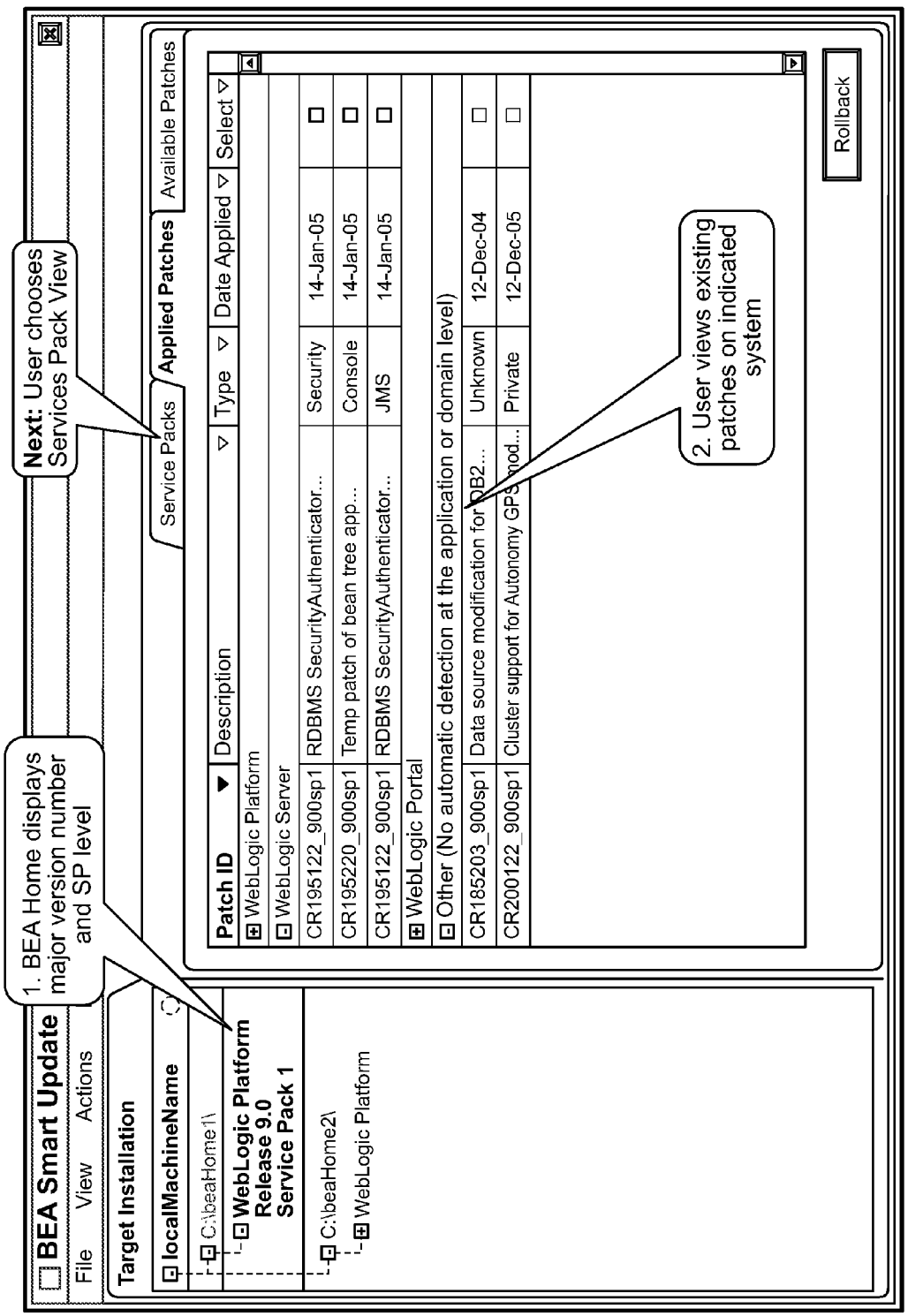
Figure 17D:
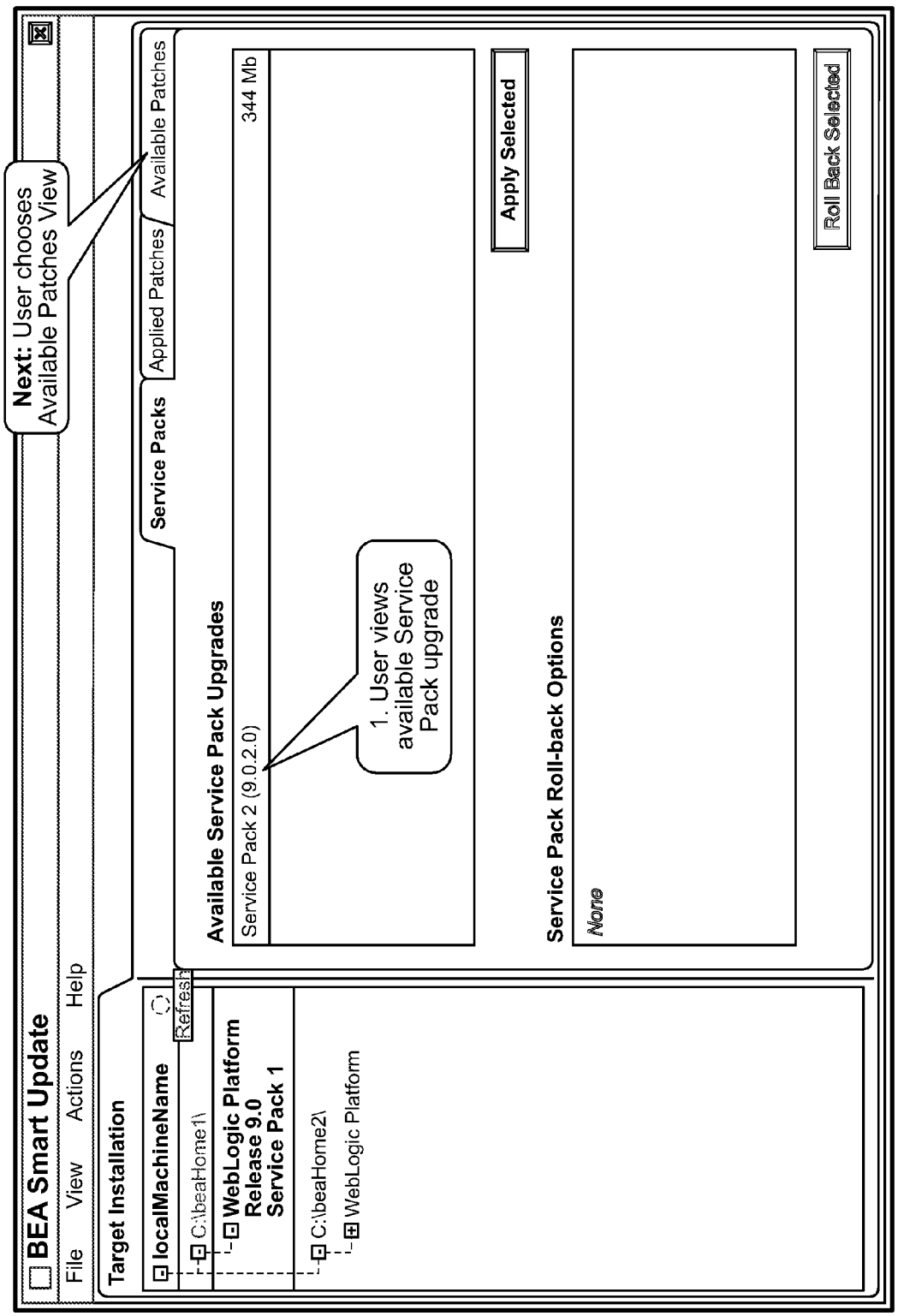
Figure 17E:
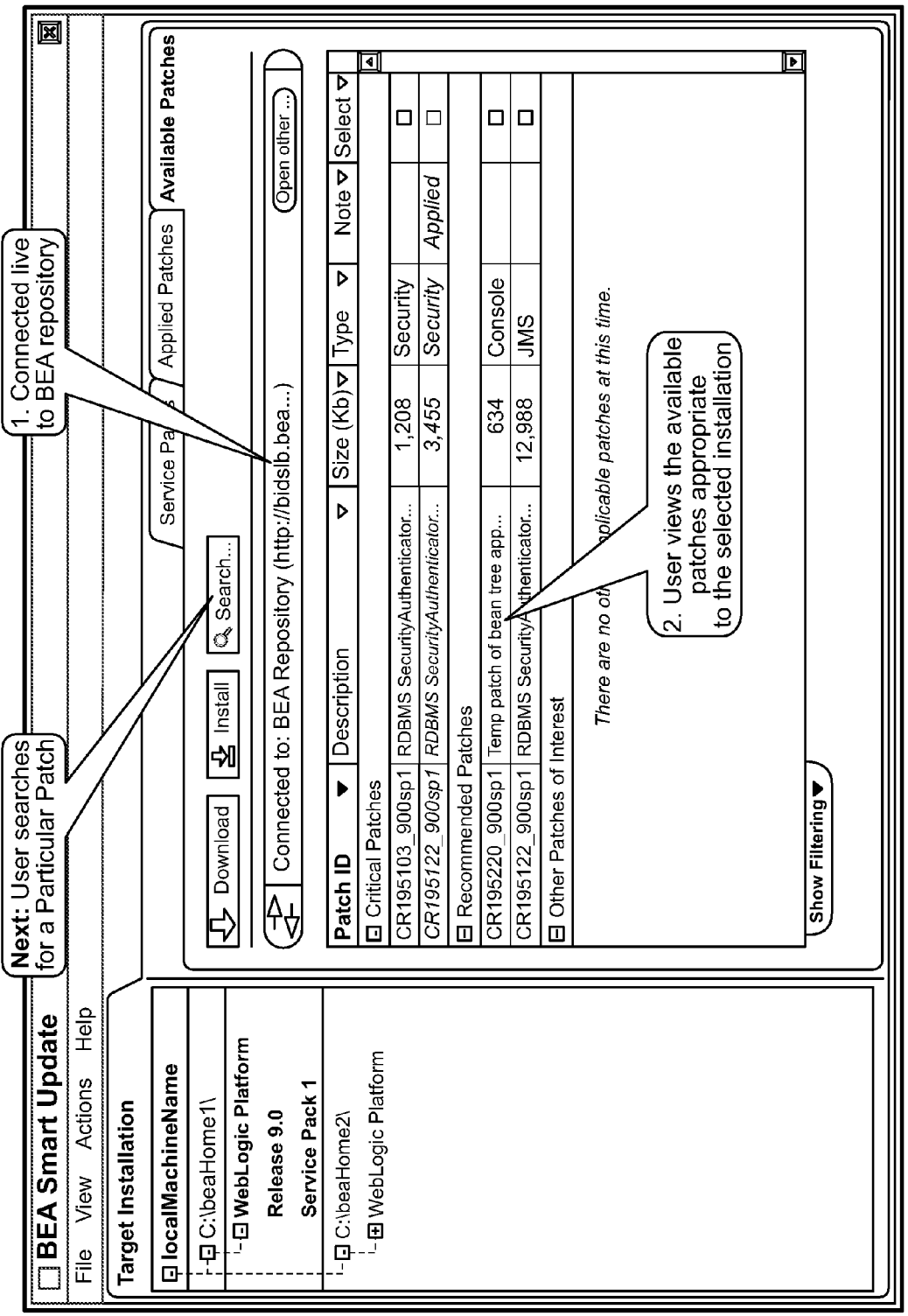
Figure 17F:
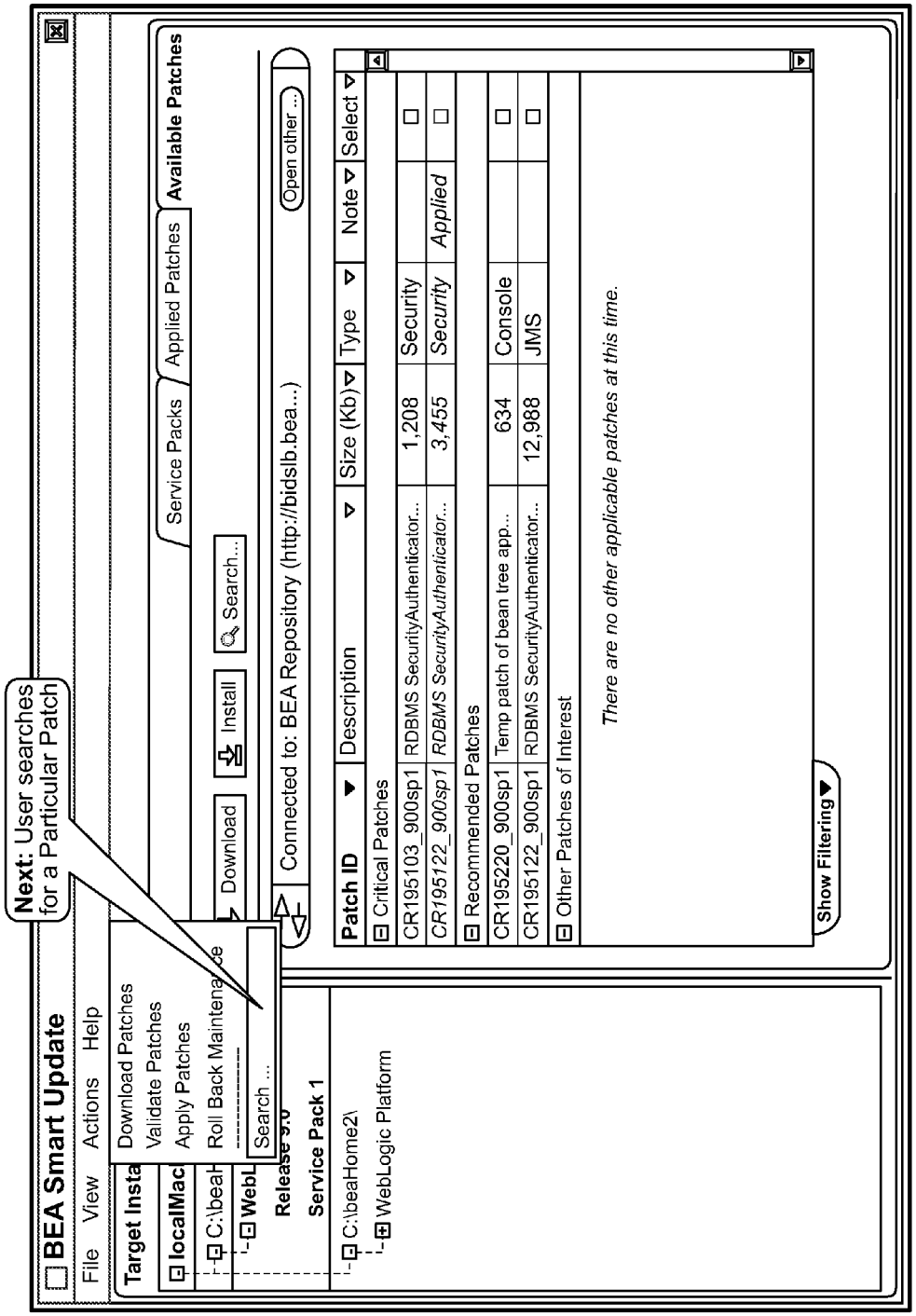
Figure 17G:
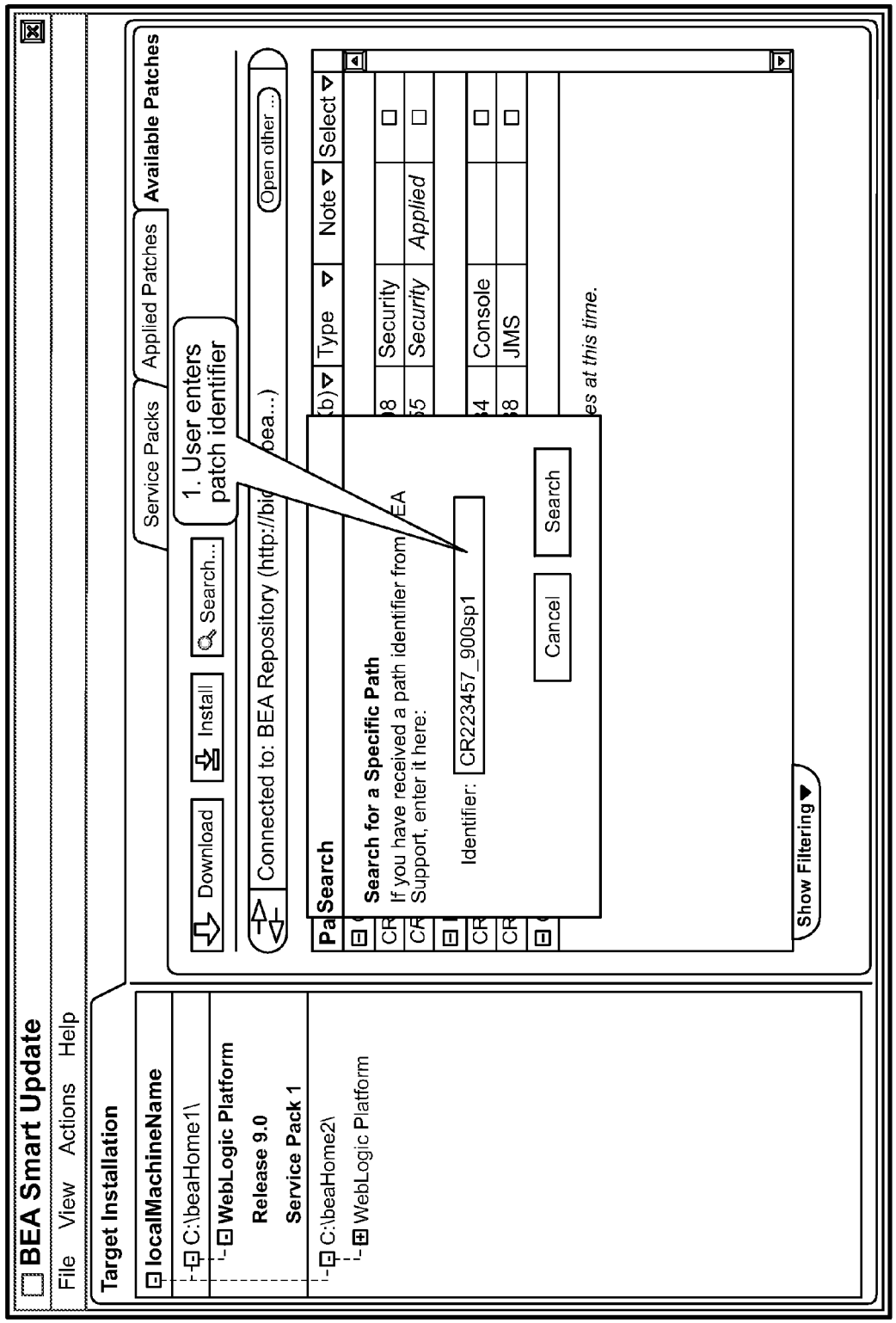
Figure 17H:
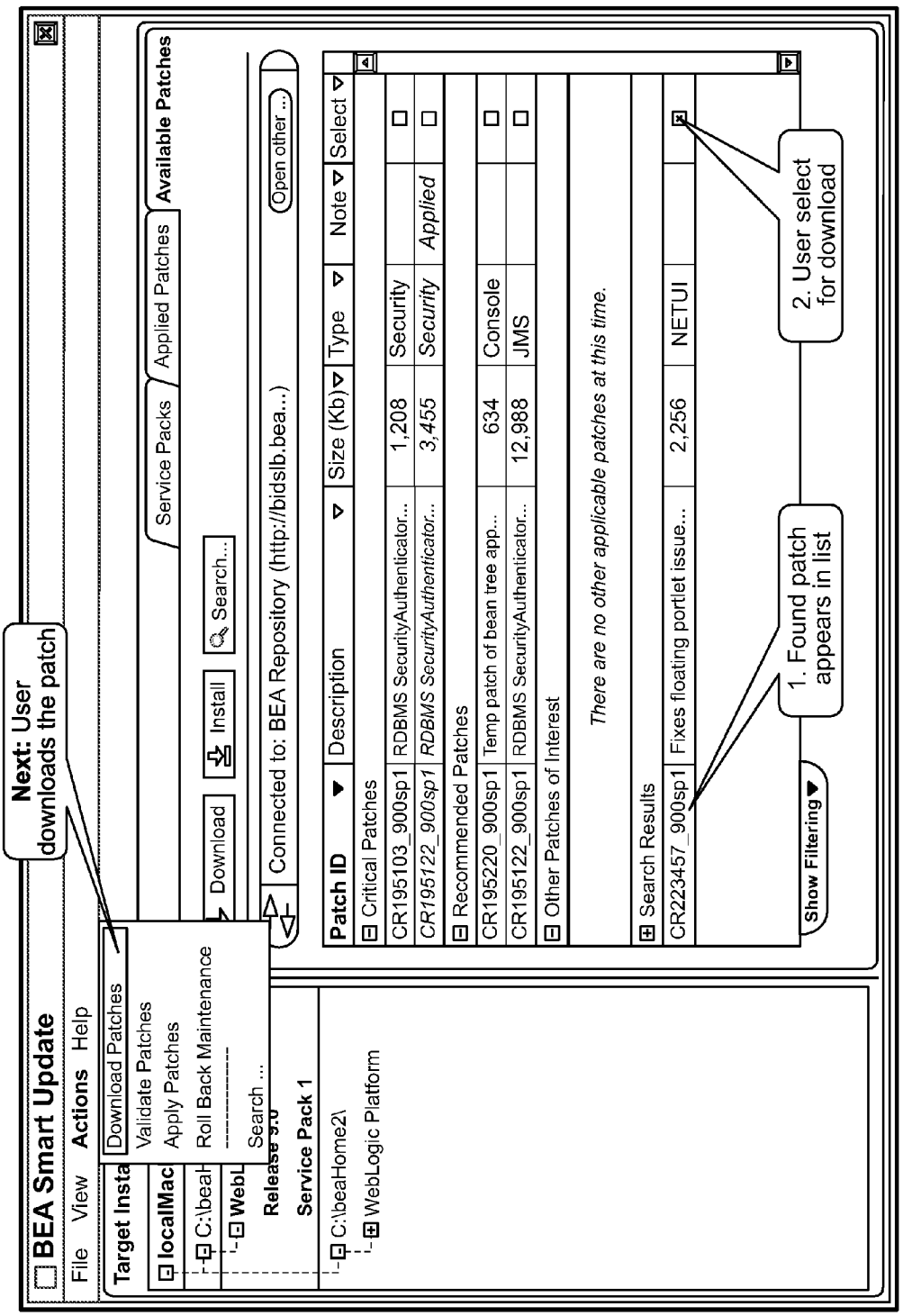
Figure 17I:
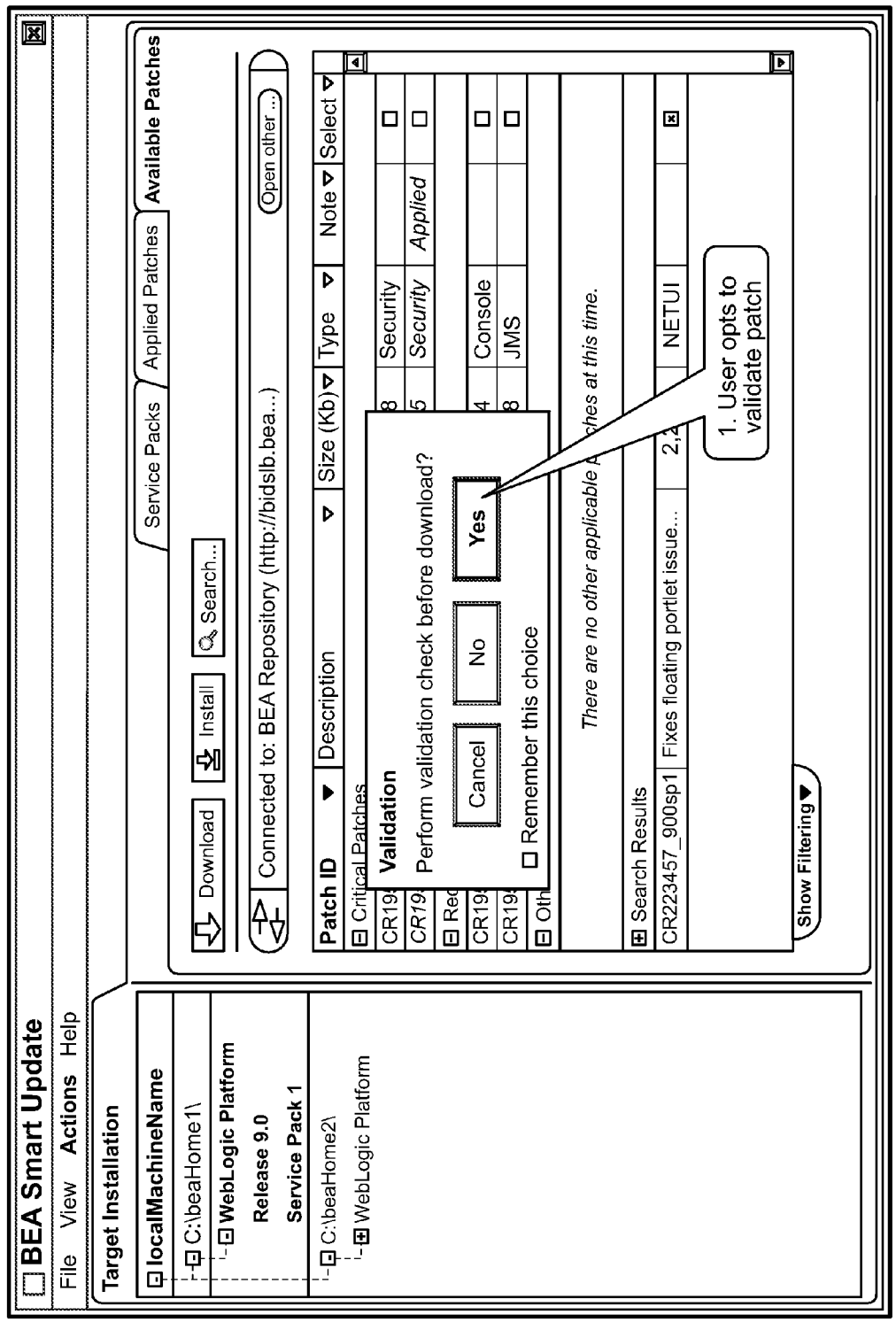
Figure 17J:
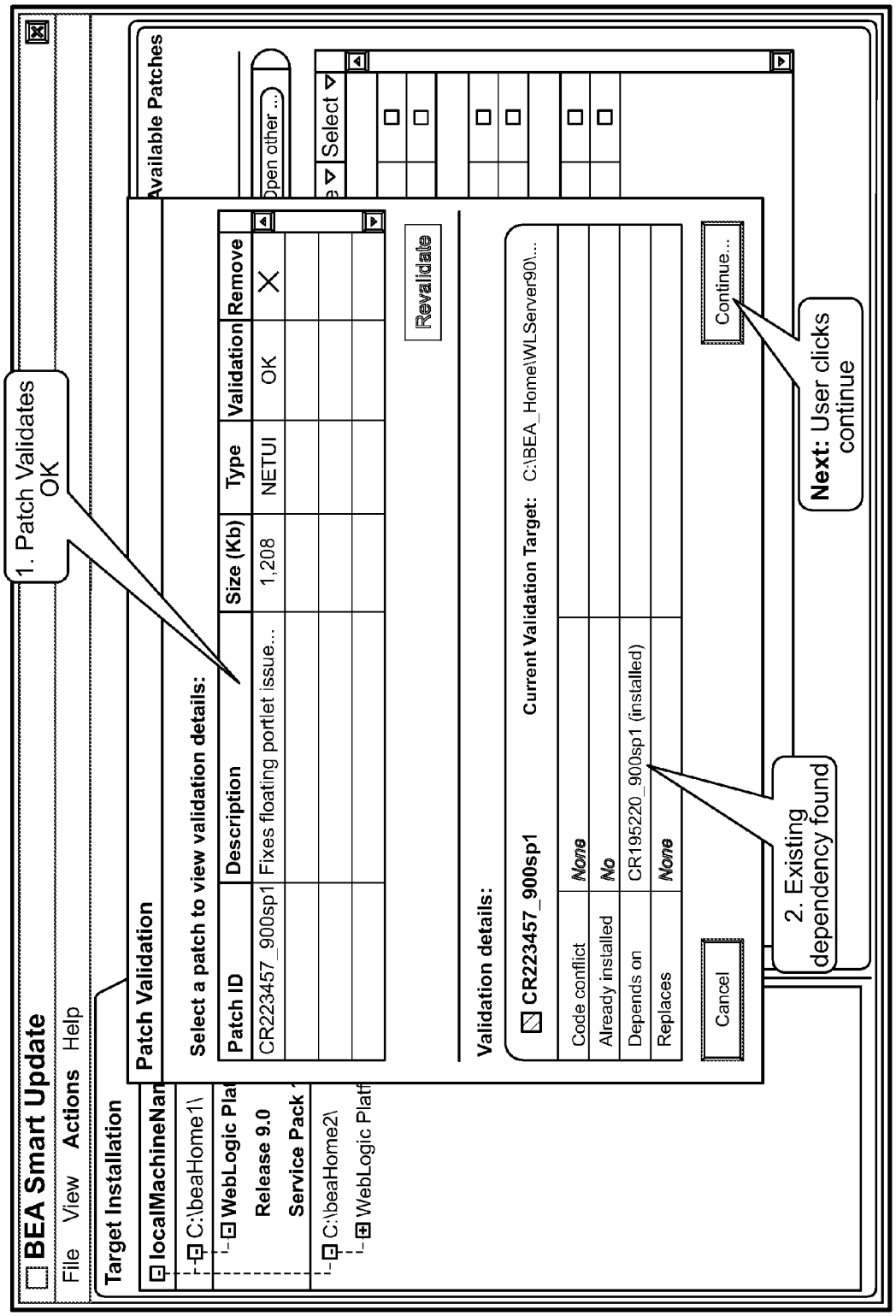
Figure 17K:
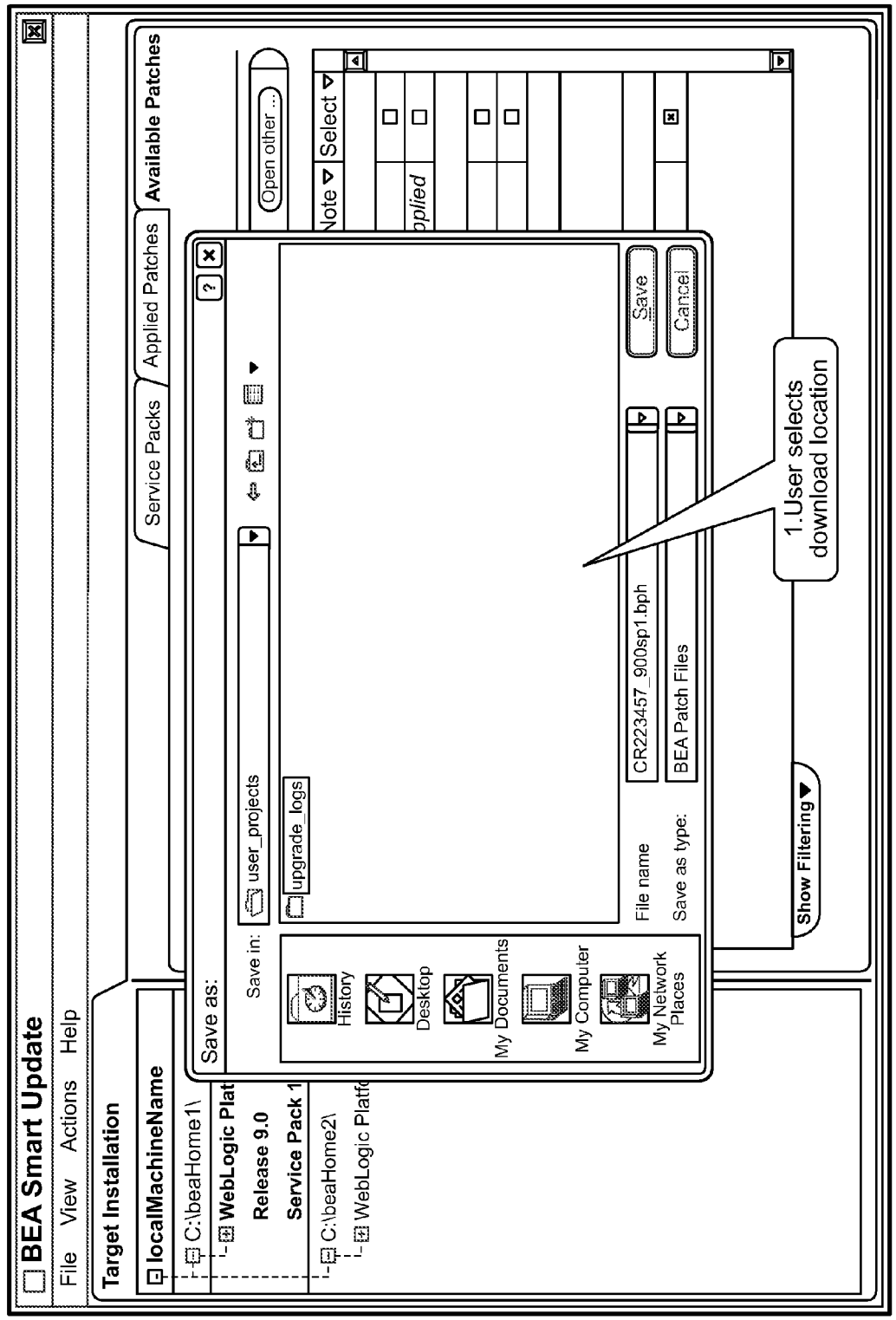
Figure 17L:
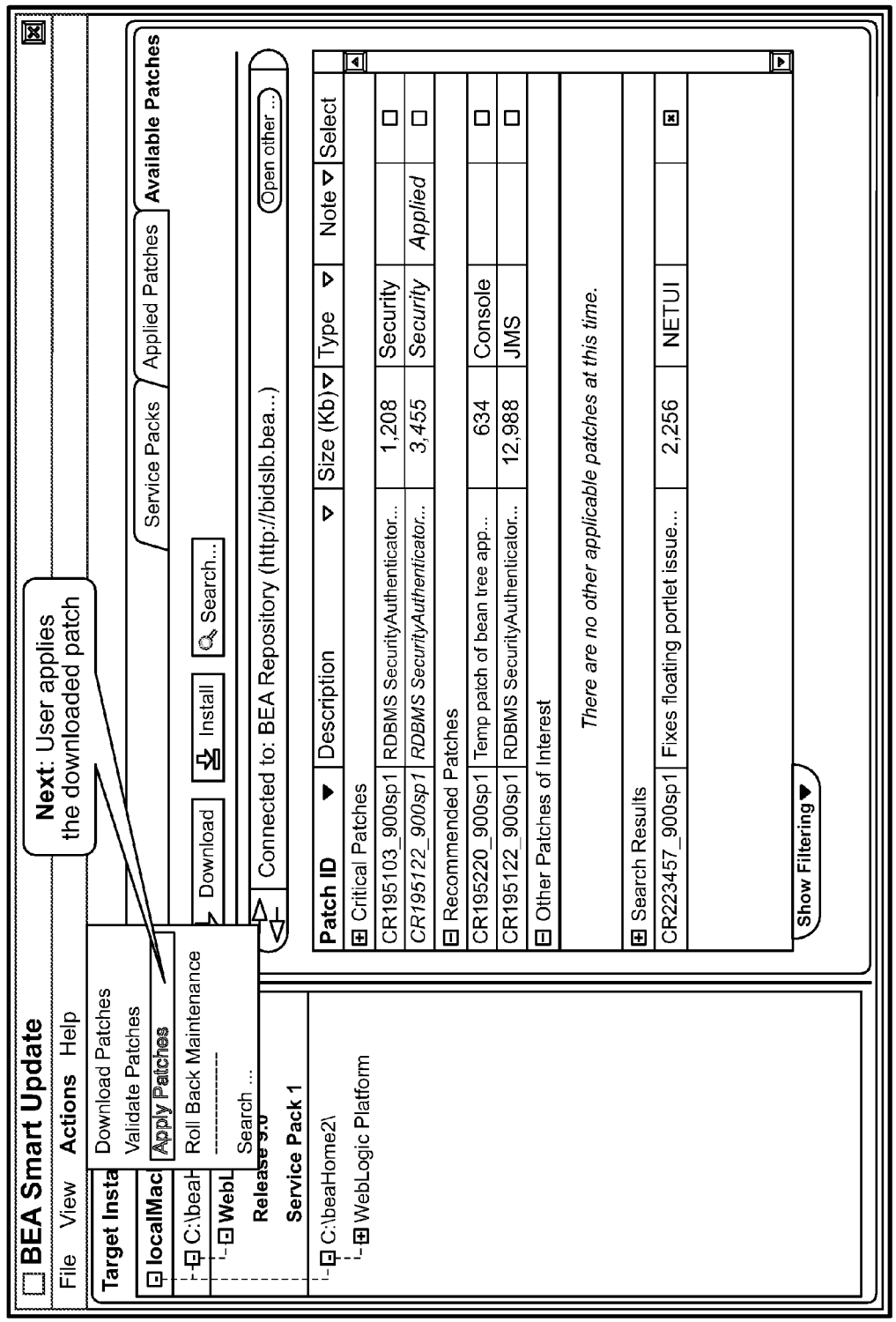
Figure 17M:
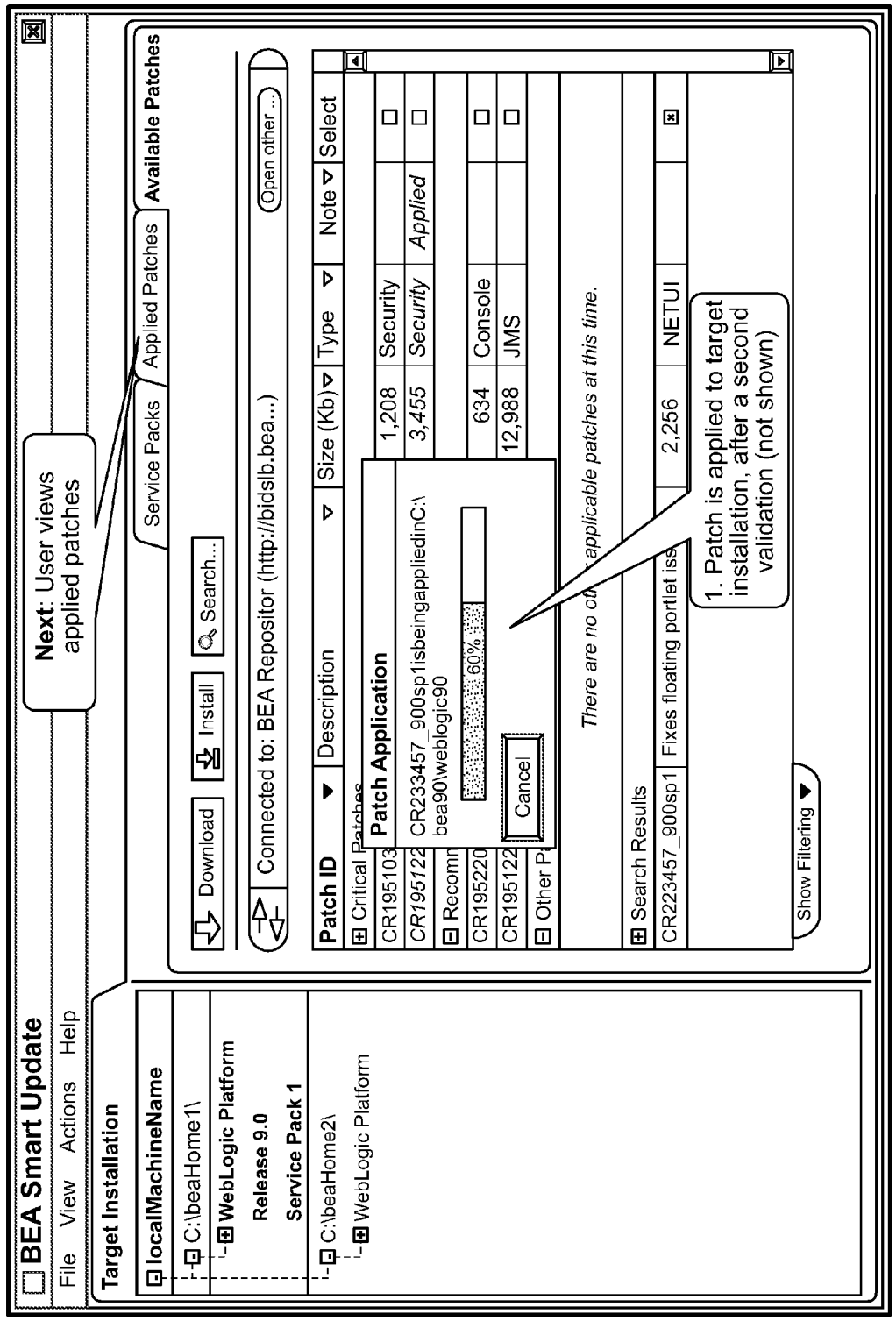
Figure 17N:
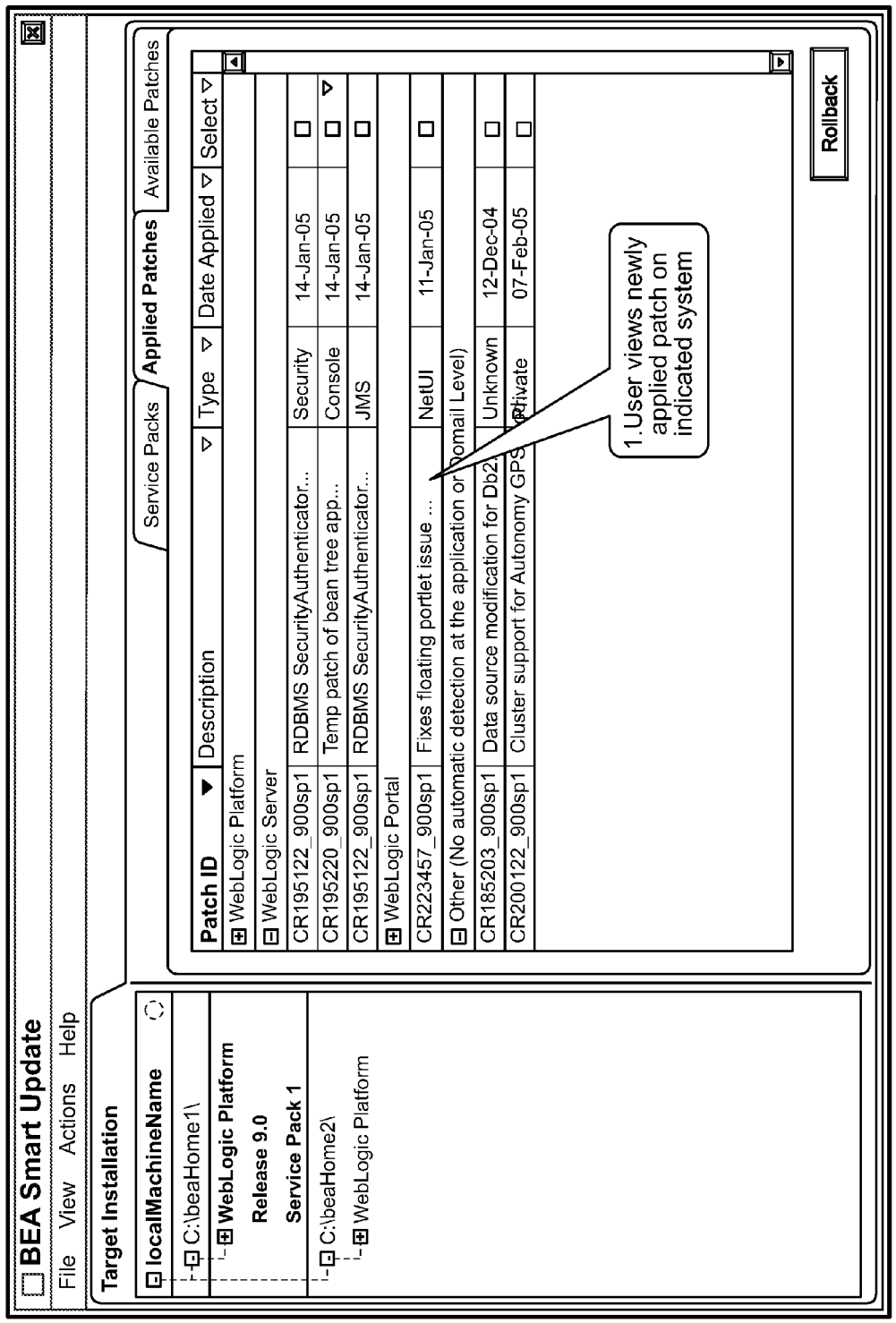
Figure 18B:
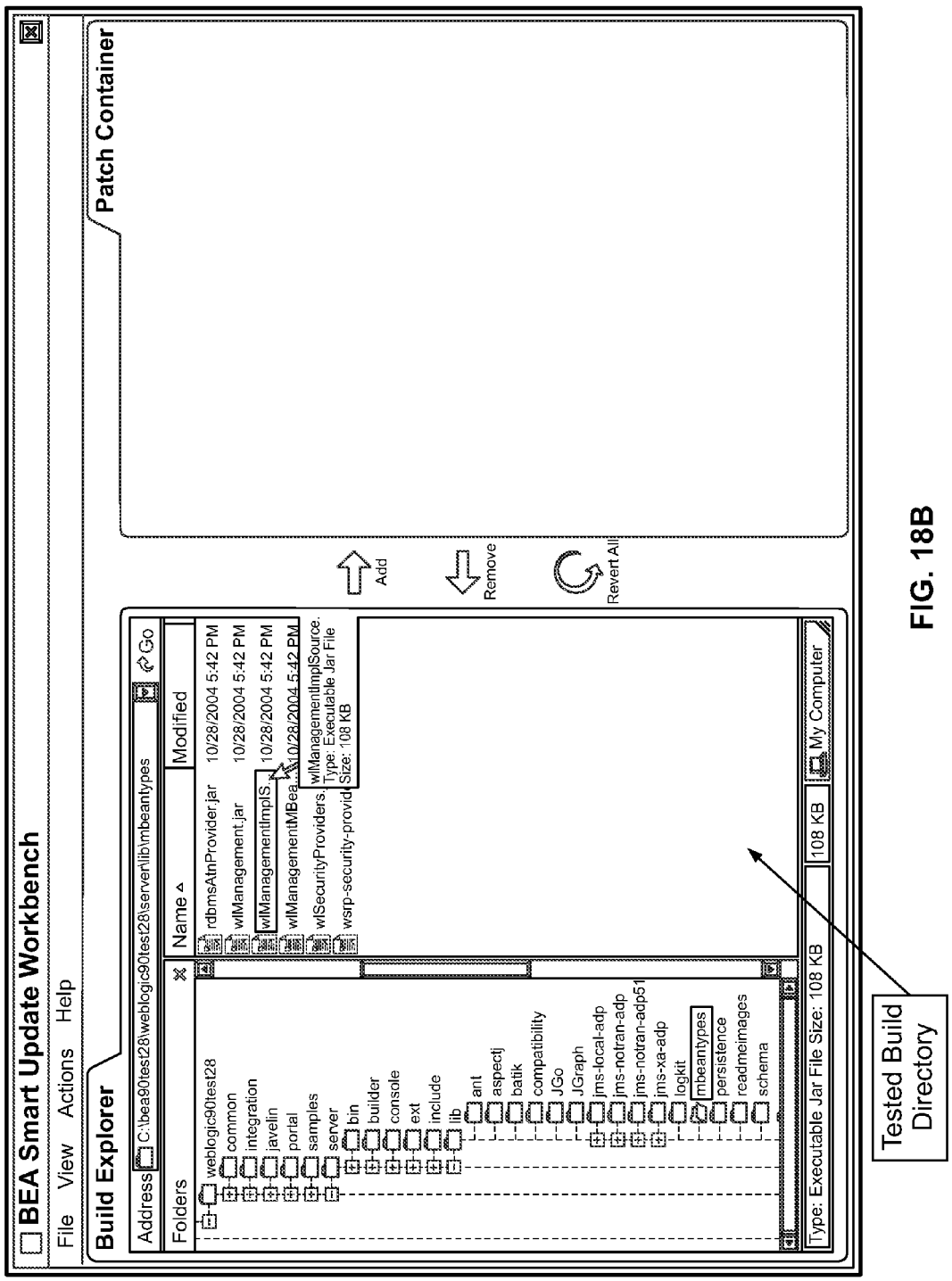
Figure 18C:
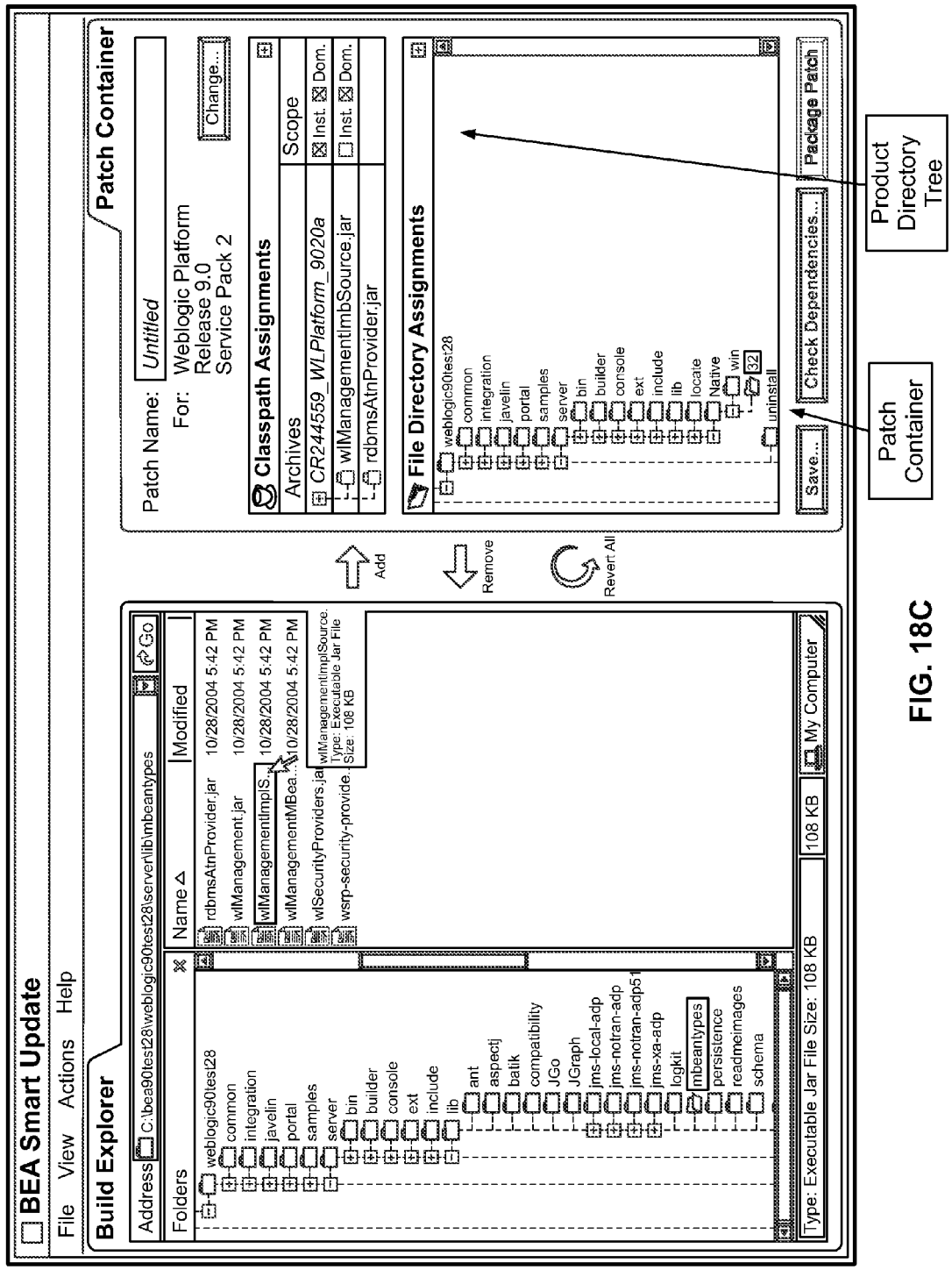
Figure 18D:
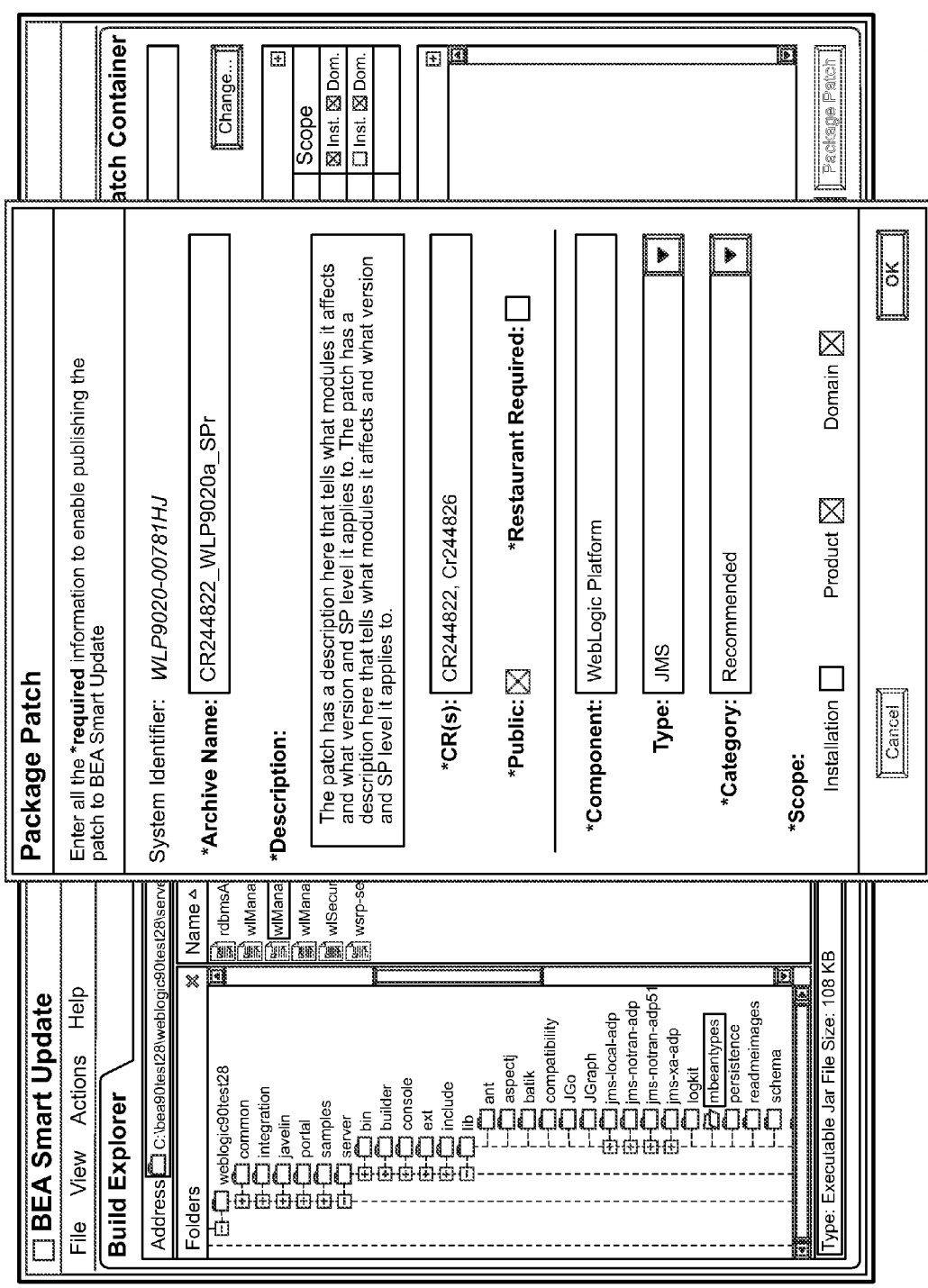
Figure 18E:
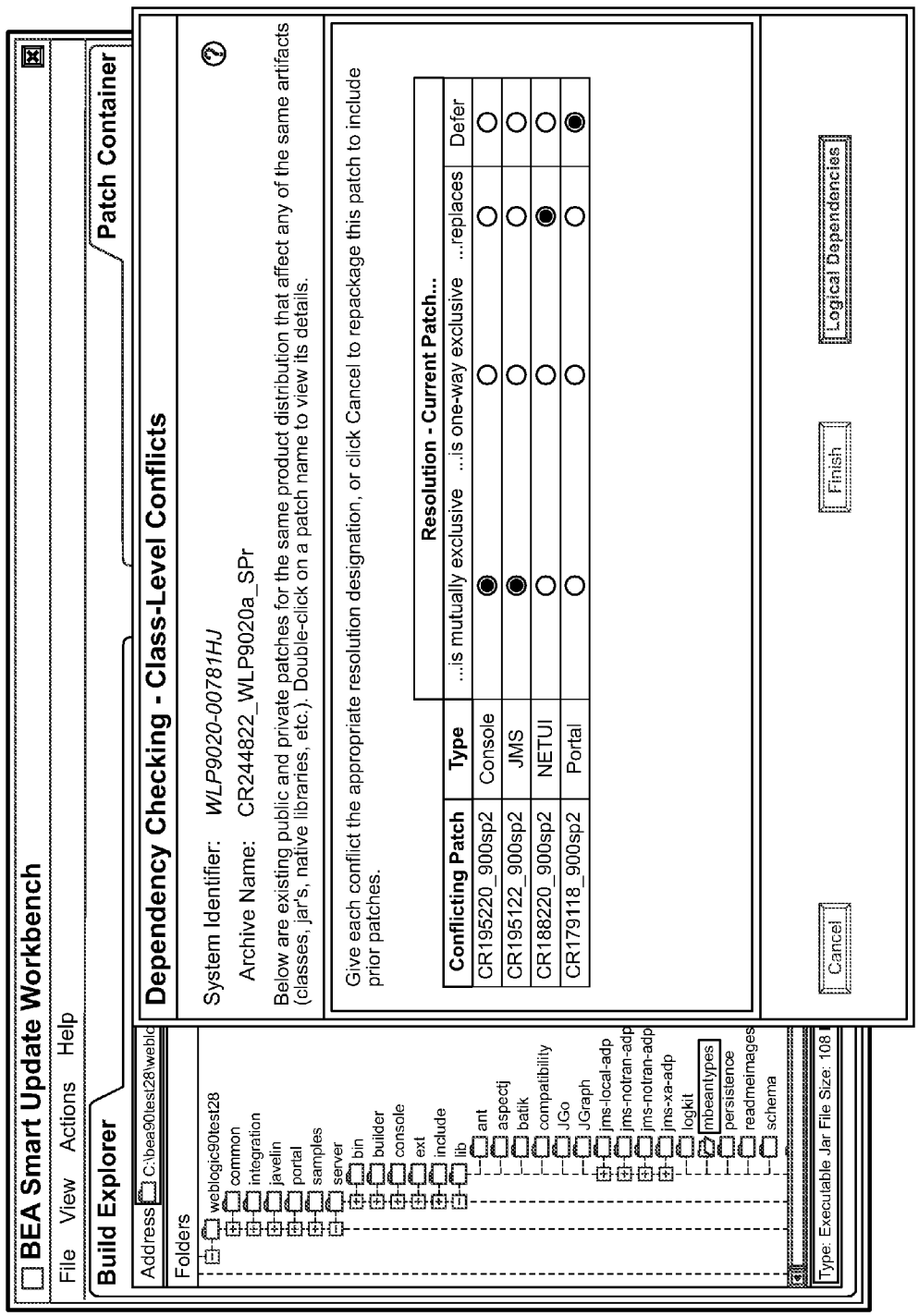
Figure 18F:
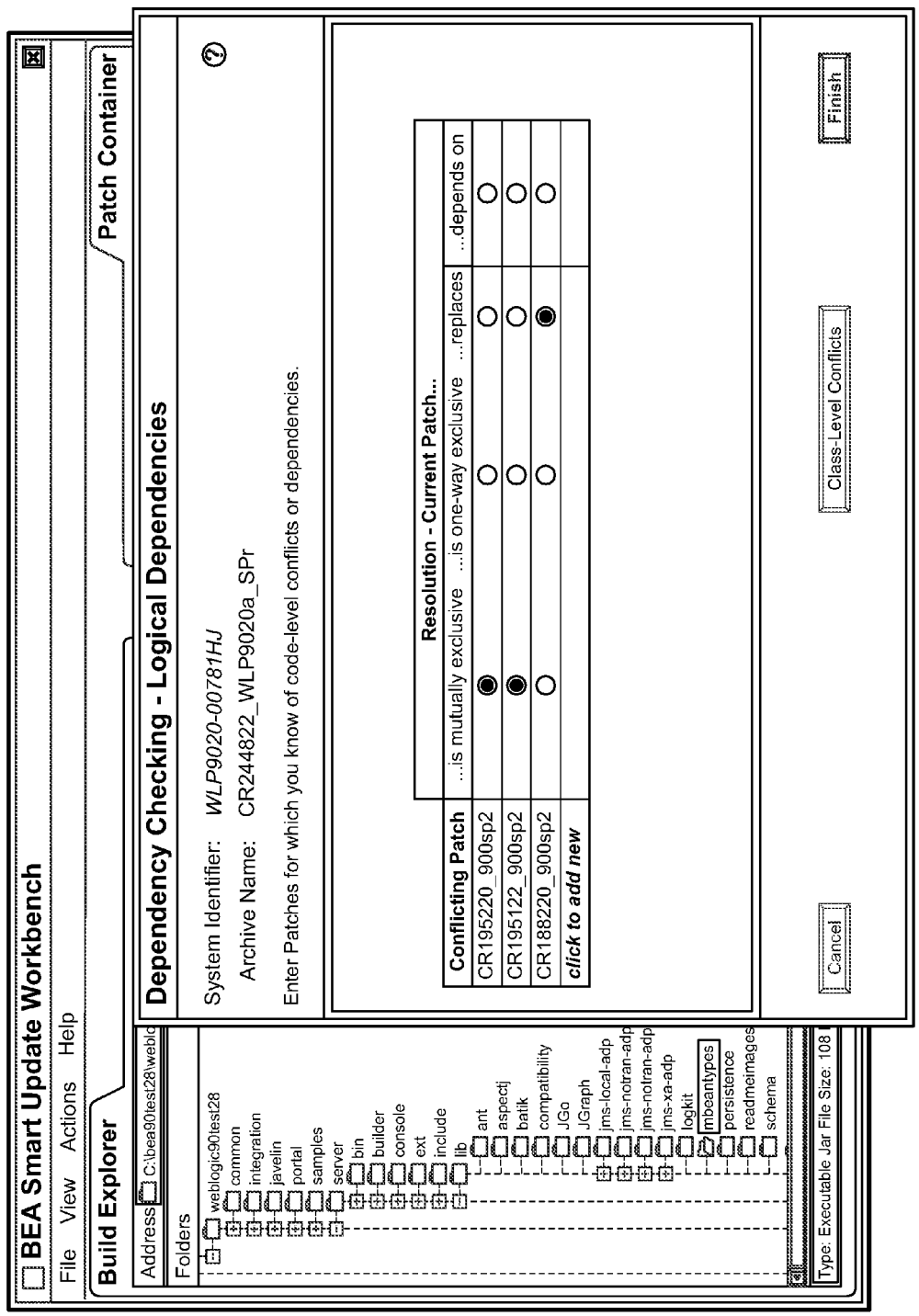

FIGS. 17A-N illustrate exemplary graphical user interface displays for a local patch management screen of one embodiment.

FIGS. 18A-F illustrate additional graphical user interface displays for a system of one embodiment.

Further details of a non-limiting example are given below.

The Customer-. Centric Engineering (CCE) workflow can be comprised of the following steps.

Analyze
Code
Build
Stage
Check Dependencies
Package
Upload
Activate

The CCE engineer can determine source code changes required and make a basing decision.

The CCE engineer can check files out for edit and submit to the source control system after completing code changes and unit tests. Source control (checkin/checkout) and build (compilation of source) can be completed prior to invocation of the Patch Management tool, i.e. the tool need not be tightly coupled to a source control system. Note however that the tool can integrate with the source control system by including a Change Request (CR) attribute in the data model that allows correlation of a patch with source files used to create the patch. CCE can stores patch source files in a directory name with an embedded CR number.

The CCE engineer can compile source code to produce classes, native binaries and other artifacts.

Staging is defined as transformation of the build result to create files, e.g. archives, suitable for use on a customer system. Staging can be influenced by artifact type and scope. An artifact's type and scope determine where it is installed and how it is loaded or referenced by the containing system.

An artifact's type refers to intrinsic characteristics of the artifact as well as the method by which the artifact is activated on a target system. Exemplary artifact types are listed below.

Archives containing classes that supersede existing classes using class loading mechanisms. One example is placement in an existing system classpath before archives containing the same classes (same package/class names, but different content).

Native code artifacts that supersede the same artifacts already installed on the system by placing the artifacts earlier in the path or library path.

Any artifacts that are directly installed over other artifacts on a system at a specific location.

Two artifact scopes exist, based on whether the artifact is part of the base system or is a deployable or associated with a deployable. Note that a patch artifact may be loaded from the system classpath, yet be associated with a deployable.

The system scope can include core application server classes that are loaded by inclusion in the system classpath or by manifest classpath entries contained in jars in the system classpath. In one embodiment, server classes may be loaded by a separate classloader. This is equivalent to a system classloader for the purpose of this discussion. The relationship to base application server functionality can be the defining characteristic of this scope. This scope also can include native binaries used in support of core application server functionality. Lastly the system scope can include any other artifacts supporting core application server functionality, rather than support of a deployment unit.

Application scope can include classes that are part of a deployment unit or loaded by an application class loader. Also included in this scope can be artifacts strongly coupled to these classes.

The CCE engineer can first select the patch scope, either application server (system) scope or application (component) scope.

Multiple panels, each in a tab window, can be used for staging of different artifact types. Each panel can present a build area view and staging view. Artifacts can be moved from the build area view to the staging view for inclusion in the target patch. Separate panels can be provided for each of the following artifact types. In one embodiment:

Artifacts loaded via the classpath
Native code artifacts loaded via the path or library path
Two separate staging windows are presented, one for path and one for library path Other artifacts that replace existing artifacts on the target system residing at a specific location The staging window contains a pre-built directory list, mirroring the product directory structure, to facilitate simple location of the target directory for a particular patch artifact.

A check is run to find files in the current patch that are duplicates of files included in existing patches. A file is considered a duplicate if it matches on path and file name. This applies to classes contained in product or domain classpath archives and standalone files containing the same name and path in the product directory tree.

Each match found during the check is represented visually as a relationship between the current patch and established patch containing at least one duplicate file.

A CCE engineer must indicate a dependency condition between the two patches. Dependency values are defined later in this document in the Patch Dependencies section.

Apart from relationships arising from duplicate file detection, provision is made to enter additional dependency rules for a patch.

Each dependency relationship is expressed as a single dependency between two patches.

Packaging is defined as creation of an archive for use by the patch installation program, when installing a patch on the customer system. The archive contains files produced during the staging process.

An option exists to create a patch on the local system.

Packaging automatically occurs during the upload step. This step packages the patch and moves it to the production server.

Patches existing on the production server are not accessible by the external Patch Management tool (customer tool) until activated. This allows upload and testing without exposing a patch to external access.

Several assumptions are enumerated below to provide appropriate context for statements made under this section. In one embodiment:

The base for all patches is a specific GA or SP product instance. Patches never span either a GA or SP boundary, A maintenance archive is always included as the first file in the server system classpath The patch installer injects patches into the archive and tracks changes and stores necessary backup files to enable rollback. The scope of rollback requires more definition. For example, can a customer rollback to any prior maintenance level for a given system?

When injecting patches, files with duplicate names are replaced. The consequences of the replacement of duplicately named files are contemplated when creating the patch dependency graph.

Native code tiles are completely replaced. Backup and rollback processing applies equally to this class of files.

A facility to handle domain patches needs further definition. One use case is patching of WLI library modules residing within a domain. These don't exist under the product directory.

This applies that, there is a method to track the maintenance level of a domain. We need to investigate if there are current mechanisms to detect conflicting maintenance levels between BEA supplied domain files and files in the BEA product directories. If not, this appears to be a requirement. On a related note, it would be nice to have a tool available for customers and support to quickly analyze whether a domain and product distribution are synchronized at a particular maintenance level.

Source files used to build a patch are managed by a source control system.

Files are stored in a location unique to each patch.

A model can be created to map all source files by patch. The model expresses file relationships among patches. A patch dependency graph is created from the model, using file relationships to determine dependencies.

Patches containing no file overlap are considered compatible and therefore can be installed and function correctly together.

FIG. 9 shows an example of prerequisite patches.

Notes on the scenario of FIG. 9:

Patch 1 requires Patch 2, where Patch 2 contains functionality required for Patch 1 to work effectively, We detect and handle cyclic dependencies automatically. This enables co-requisite handling without defining a new semantic, i.e. you can code Patch 1 to depend on Patch 2 and Patch 2 to depend on Patch 1.

Cyclic dependencies can be handled as a heuristic to be handled internally. The way this would work is that cyclic dependencies are automatically detected during the patch creation process. Patch dependencies can be coded in a manner that avoids such cycles.

The dependency blueprint supporting this is coded to show the dependency for both the dependent patch and the prerequisite patch. This will optimize processing, e.g. the patch rollback scenario where a customer should generally not be allowed to rollback a prerequisite patch while the dependent patch exists on the system.

Note that multiple prerequisites can be coded, e.g. in the above example, Patch 1 could require Patches 2 and 3.

FIG. 10 shows an example of invalidated patches.

Patch 1 is superseded by Patch 2, where Patch 2 is certified not to introduce negative side effects as it provides improved functionality for problems that Patch 1 attempted to address.

Patch 1 can no longer be applied to any system.

When applying Patch 2 over Patch 1, duplicates files are replaced, non-duplicate files from Patch 1 are removed and new files from Patch 2 are applied.

FIG. 11 shows an example of mutually exclusive patches.

Patch 1 and Patch 1 cannot be applied concurrently to a target system.

FIG. 12 shows an example of unilaterally exclusive patches.

We have described specific dependency types to express relationships among patches. For one dependency category (invalidated), we express patch state as well as relationship (patch "A" is invalidated and patch "B" replaces patch "A").

Dependency management is enabled via a directed adjacency graph for each dependency type. As described earlier, dependencies are expressed as a relationship between two patches. The relationship can be evaluated from the standpoint of either of the patches. For example we can say that patch "A" depends on patch "B" (prerequisite) or conversely that patch "B" is required by patch "A".

"Prerequisite"
"Invalidated"
"Unilateral Exclusive"
"Bilateral Exclusive"
"Prerequisite Reversed"
"Invalidated Reversed"

"Unilateral Exclusive Reversed"
"Bilateral Exclusive Reversed"

Patch conflict detection can be enabled by an API accepting product, product version, patch we want to validate and list of installed patches. For the invalidated dependency type, we facilitate a Boolean state check for a specific patch, i.e. we indicate if the target patch has been invalidated.

A helper function can accept two patch lists and indicate if one list is a subset of the other. This can be used by a CCE tool to validate that a replacement patch supports all dependencies associated with the invalidated patch.

Customer patch management can be comprised of the following broad steps.
   View and Select Patches
   Validate Patches (Check Dependencies)
   Download Patches
   Install Patches
   The patch view is derived from the PatchDetail model, or a filtered object based on the PatchDetail model.
   Attributes contained in the model are used to filter the view.
   Only patches defined with the public attribute are available for viewing, except under the following circumstance.
   Private patches appear in the patch view when the customer support ID for the current user is associated with a patch. A CCE or support engineer associates a private patch with a customer support ID using the patch management tool. A table, used internally by the tool, facilitates private patch access by mapping patch ID's to customer support ID's.

Ptch information can be viewed using the command syntax specified in the following paragraph. A command file or shell script (bsu.cmd/sh) sets the execution environment and launches a java class with arguments parsed from the command line. Note that the standard "-log=" and "-log_priority" parameters routinely used in other tools, e.g. installers and configuration wizard, can apply to this command as well. A warning message can be generated when unsupported parameters are entered. The message identifies each unsupported parameter along with the warning message.

bsu [-prod_dir=<product_directory>] [-profile=<profile_name>] [-patch_download_dir=<path>] -status=downloaded|applied [-verbose] -view Argument Definition:
   -prod_dir
      Specifies the target product directory, e.g. "c:\mybeahome\weblogic90", where weblogic90 is the root directory of a WebLogic Platform 9.0 installation.
   -profile
      Specifies the patch profile name. If unspecified, the default patch profile is used. If a nonexistent profile is entered, the default patch profile is used and a warning message is generated identifying the specified profile and indicating use of the default profile.
   -patch_download_dir
      Specifies the directory to scan for available patches. If unspecified, the default download directory is used. Note that this location is configurable as a preference in the patch management tool.
   -status (required for clarity)
      Applied: Displays patches installed into the selected profile.
      Downloaded: Displays patches available for installation from the indicated cache directory.
   -verbose
      If specified, detailed information for each patch is displayed. If unspecified, only patch ID's are displayed.
   -view
      View patches. If this is not specified, the GUI tool is launched.

This example demonstrates the command line used for viewing downloaded patches without the verbose option.
Command:
bsu -prod_dir=c:\beahome\weblogic90- patch_download_dir=c:\downloads\mypatches -status=downloaded -view
Output:
ProductName: WebLogic Platform
ProductVersion: 9.0-sp1
Components: WebLogic Server/Server, WebLogic Server/Server Examples,
   WebLogic Service Bus/Service Bus Server, WebLogic Service Bus/Data
Transformation Tools,
   WebLogic Service Bus/Service Bus Examples,
BEAHome: c:\beahome
ProductHome: c:\some_other_dir\weblogic90
JavaHome: c:\beahome\jrockit90_150
JavaVersion: 1.5.0
JavaVendor: BEA
PatchID: patch20_weblogic90_sp1
PatchID: patch537_weblogic90_sp1
PatchID: patch2004_weblogic90_sp1

This example demonstrates the command line used for viewing downloaded patches with the verbose option.
Command:
bsu -prod_dir=c:\beahome\weblogic90- patch_download_dir=c:\downloads\mypatches -status=downloaded -verbose -view
Output:
ProductName: WebLogic Platform
ProductVersion: 9.0-sp1
Components: WebLogic Server/Server, WebLogic Server/Server Examples,
   WebLogic Service Bus/Service Bus Server, WebLogic Service Bus/Data
Transformation Tools,
   WebLogic Service Bus/Service Bus Examples,
BEAHome: c:\beahome
ProductHome: c:\some_other_dir\weblogic90
JavaHome: c:\beahome\jrockit90_150
JavaVersion: 1.5.0
JavaVendor: BEA
PatchID: patch20_weblogic90_sp1
PatchContainer: patch20_weblogic90_sp1.jar
Checksum: 53900
Component: WebLogic Server
Severity: Critical
Category: Security
CR: CR092537
Restart: Server
Description: Include information about the patch in this field. Scroll data appropriately as demonstrated in this specification. Display information for each attribute in the model starting in a column consistent across all attributes. This implies using a tab stop that allows for the attribute name with the greatest number of characters.
PatchID: patch537_weblogic90_sp1
. . .
PatchID: patch2004_weblogic90_sp1
. . .

This example demonstrates the command line used for viewing applied patches without the verbose option.
Command:
bsu -prod_dir=c:\beahome\weblogic90-profile=testnewpatch -status=applied -view
Output:
ProductName: WebLogic Platform
ProductVersion: 9.0-sp1
Components: WebLogic Server/Server, WebLogic Server/Server Examples,
WebLogic Service Bus/Service Bus Server, WebLogic Service Bus/Data
Transformation Tools,
WebLogic Service Bus/Service Bus Examples,
BEAHome: c:\beahome
ProductHome: c:\some_other_dir\weblogic90
JavaHome: c:\beahome\jrockit90_150
JavaVersion: 1.5.0
JavaVendor: BEA
PatchID: patch5_weblogic90_sp1
PatchID: patch12_weblogic90_sp1
PatchID: patch167_weblogic90_sp1
PatchID: patch1003_weblogic90_sp1

This example demonstrates the command line used for viewing applied patches with the verbose option.
Command:
bsu -prod-dir=c:\beahome\weblogic90-profile= testnewpatch-status=applied -verbose -view
Output:
ProductName: WebLogic Platform
ProductVersion: 9.0-sp1
Components: WebLogic Server/Server, WebLogic Server/Server Examples,
WebLogic Service Bus/Service Bus Server, WebLogic Service Bus/Data
Transformation Tools,
WebLogic Service Bus/Service Bus Examples,
BEAHome: c:\beahome
ProductHome: c:\some_other_dir\weblogic90
JavaHome: c:\beahome\jrockit90_150
JavaVersion: 1.5.0
JavaVendor: BEA
PatchID: patch5_weblogic90_sp1
PatchContainer: patch5_weblogic90_sp1.jar
Checksum: 53900
Component: WebLogic Server
Severity: Critical
Category: Security
CR: CR092537
Restart: Server
Description: Include information about the patch in this field. Scroll data appropriately as demonstrated in this specification. Display information for each attribute in the model starting in a column consistent across all attributes. This implies using a tab stop that allows for the attribute name with the greatest number of characters.
PatchID: patch12_weblogic90_sp1
. . .
PatchID: patch167_weblogic90_sp1
. . .

The Patch Management System GUI can provide an option to capture a patch "snapshot". The menu item can be Patches>Patch Profiles>Save Snapshot Menu. This option can invoke a file dialog box that allows the user to select a directory and file name to store patch information. A saved snapshot can contain the same information produced by a command line option including the "-status=applied" and "-verbose" options. Patch information can be retrieved for the currently selected patch profile in the GUI.

In one embodiment:

Patches are validated by applying the PatchDependency model to the combination of selected patches and already installed patches on the customer's system. See the prior Patch Dependencies section for more information.

Patch validation can be invoked optionally after new (non-applied) patches are selected for download.

Patch validation always occurs implicitly during patch installation.

Selected patches can be downloaded to a user configurable directory. The customer is prompted to establish a download cache directory the first time a patch is downloaded using the Smart Upadate tool. Thereafter, this directory can be configured by setting preferences via a menu entry.

The patch management tool always determines patch availability status by viewing the cache directory. If a patch is downloaded to a given cache directory and the directory is subsequently changed, the tool will not recognize patches in the former directory.

As mentioned previously, a dependency check occurs prior to physical patch installation.

There are different methods of patch installation to support two categories of artifacts. See a description of the staging process in section "BEA Internal Patch Creation" of this document to understand how the two categories of artifacts are created in a patch. The methods and artifact categories are detailed below.

Inclusion of patch archives in the classpath to patch—
java classes that support component code infrastructure Replacement of files (with backup of existing files) to patch—
native binaries, including
socket muxers,
web server plugins,
file IO accelerators,
Windows service helper,
JCOM binaries,
java tools,
domain and domain extension templates,
all sample related files, and
miscellaneous text files, including HTML Two scopes/see prior section/2 possible scopes—pending research/crated during staging/user prompt/domain scope—not yet molded A patch can be scoped at either the product or domain level. Scope refers to a patch's breadth of effect, e.g. when I apply a patch, will it effect all domains or only a single domain. For V2, application and perhaps server scoping may apply based on ongoing research with component teams.

During patch staging (see the "BEA Internal Patch Creation" staging section), the scope is determined.

A patch can be designated as capable of application at multiple scopes. However, application of patch artifacts must be scoped consistently, i.e. scope application for artifacts in a patch must be homogenous.

If multiple scopes can apply for a patch, the user will be prompted for scope selection prior to physical installation of the patch.

Scope information is tracked in the product-wide or domain-specific patch registry.

FIG. 13 is a functional view of server level patches of one embodiment.

FIG. 14 is a functional view of application level patches of one embodiment.

FIG. 15 is a functional view of a patch directory structure of one embodimentInstall patches using the command syntax specified in the following paragraph. The command can be invoked from a command file or shell script (such as smartupdate.cmd/sh) that sets the appropriate environment and executes a java class with arguments parsed from the command line. Note that the standard "–log=" and "-log priority" parameters routinely used in other tools, e.g. installers and configuration wizard; apply to this command as well. If the download directory does not contain any patches, the tool can emit the message "No patches exist in the specified download directory". A warning message can be generated when unsupported parameters are entered. The message can identify each unsupported parameter along with the warning message.

In one embodiment:

```
bsu     -patchlist=<patch1>[,<patch2>...]
[-prod_dir=<product_directory>]    [-profile=<profile_name>]
[-patch_download_dir=<path>] [-verbose] -install
```

-patchlist
  Specifies a patch or comma-separated list of patches to install
-prod_dir
  Specifies the target product directory, e.g. "C:\mybeahome\weblogic90", where weblogic90 is the root directory of a WebLogic Platform 9.0 installation.
-profile
  Specifies the patch profile name. If unspecified, the default patch profile is used. If a nonexistent profile is entered, the default patch profile is used and a warning message is generated identifying the specified profile and indicating use of the default profile.
-patch_download_dir
  Specifies the directory to scan for available patches. If unspecified, the default download directory is used. Note that this location is configurable as a preference in the patch management tool.
-verbose
  If specified, detailed install information is displayed during execution.
-install
  Install patches. If this is not specified, the GUI tool is launched.

This example demonstrates the command line used for applying patches without the verbose option.

It depicts a successful patch application. Progress can be indicated by repeating '.' characters, where appropriate. Conflict checking for all patches supplied on the command line occurs prior to application of the first patch. Command execution can terminate if any conflicts are detected. After conflict checking, if application of any patch fails, the "Result:" value displays "Failure" rather than "Success" and a simple error message is printed on the following line. Command execution terminates after the first patch application failure, i.e. subsequent patches supplied on the command line are not processed. Patches already applied prior to a failure on a subsequent patch are not removed.

Command:
bsu                -patchlist=patch20_weblogic90_sp1,
  patch2004_weblogic90_sp1-prod_dir=c:\
  beahome\weblogic90
-profile=testnewpatch         -patch_download_dir=c:\
  downloads\mypatches -install
Output:
Checking for Conflict Conditions . . .
No conflicts found
Installing PatchID: patch20_weblogic90_sp1 . . .
Result: Success
Installing PatchID: patch2004_weblogic90_sp1 . . .
Result: Success This example demonstrates a patch application with conflicts and resulting conflict condition display. Note that all possible conflict conditions are depicted in this example.
Command:
bsu                -patchlist=patch20_weblogic90_sp1,
  patch25_weblogic90_sp1,patch27_weblogic90_sp1,
  patch29_weblogic90_sp1-prod_dir=c:\
  beahome\weblogic90-profile=testnewpatch-
  patch_download_dir=c:\downloads\mypatches-install
Output:
Checking for conflicts . . .
Conflict(s) detected—resolve conflict conditions listed below.
patch20_weblogic90_sp1 requires the following patch(es):
  <patchid1>[,<patchid2>, . . . ]
Suggested action: Apply the indicated patches before applying this patch.
patch25_weblogic90_sp1 has been invalidated. Replace with: <patchid1>
Suggested action: Remove invalidated patch and apply replacement, if indicated.
patch27_weblogic90_sp1 is mutually exclusive with:
  <patchid1>[,<patchid2>, . . . ]
Suggested action: To apply current patch, mutually exclusive patches must be removed.
patch29_weblogic90_sp1 is partially superseded by
  <patchid1>[,<patchid2>, . . . ]
Suggested action: Remove patches partially superseding this patch, apply this patch, and re-apply superseding patches.

This example demonstrates the command line used for applying patches with the verbose option. It depicts a successful patch application followed by an unsuccessful patch application. The error condition shown is unrelated to a patch conflict. Note that for the purpose of depicting all status messages this example demonstrates application of a patch including classpath archives, native binaries and direct file replacement.
Command:
bsu                -patchlist=patch20_weblogic90_sp1,
  patch2004_weblogic90_sp1-prod_dir=c:
  \beahome\weblogic90      -profile=testnewpatch     -
  patch_download_dir=c:\downloads\mypatches -verbose -
  install
Output:
Starting installation of PatchID: patch20_weblogic90_sp1
Checking for conflicts . . .
No conflict(s) detected
Installing <patch_file_name_including_full_path>
Updating <patch_manifest_name_including_full_path>
Old manifest classpath: <old_manifest classpath>
New manifest classpath: <new manifest classpath>
Backing up <orig_file_name_including_full_path> to <backup_archive_file_name>
Installing <native_binary_file_name_including_full_path>

Installing <new_file_name_including_full_path>
Result: Success
Starting installation of PatchID: patch2004_weblogic90_sp1
Checking for conflicts . . .
No conflict(s) detected
Installing <patch_file_name_including_full_path>
Updating <patch_manifest_name_including_full_path>
Old manifest classpath: <old_manifest_classpath>
New manifest classpath: <new_manifest_classpath>
Backing up <orig_file_name_including_full_path> to <backup_archive_file_name>
Installing <native_binary_file_name_including_full_path>
Installing <new_file_name_including_full_path>
Result: Failure
Failure condition follows:
IO error occurred while installing patch—run with logging to obtain detailed information.

Patch removal includes removal of all patch artifacts associated with the target PatchID. Classpath manifest entries are adjusted to remove archive references. Patch metadata is updated to delete references to the PatchID.

Prior to patch removal, dependencies on the patch being removed are calculated. The removal process may stop at this point if the target patch cannot be safely removed. An appropriate dialog is presented displaying patch conflicts.

Patch jar entries are removed from the manifest classpath. As illustrated in Section 6.4.3, "Install-level Patch Directory Structure", the manifest classpath in profiles/target_profile_name/weblogic_patch.jar is modified ("target_profile_ name refers to the active profile at time of patch removal).

Files modified by the patch selected for removal are restored to their prior state. The process of restoration is illustrated in the following section and described briefly in the following paragraph.

When replacing a native binary file or other product file, the file replacing the current version is stored in backup/patch backup.jar. If this is the first patch to the target file, the version of the file prior to the replacement as well as the replacing file are stored in the backup jar. This allows a consistent restoration paradigm when removing a patch. The Patch Backup Manifest (PatchBackupManifest), described in section 4.4, details information captured as each file is replaced. Each backup file must be uniquely named to allow multiple copies of a single file to coexist in the backup jar. A linked list is maintained for each PatchBackupManifest entry. As files are replaced, a backward link (PriorPatchID) is created referencing the manifest entry for the prior file version. Concurrently, the prior manifest entry is updated with a forward link to the current file version.

Lastly, the entry for the removed patch is deleted from the patch registry (PatchInstallRegistry).

FIG. 16 illustrates the operation of a patch removal process of one embodiment.

In response to customer requirement, BEA may combine several individual patches into a single patch, referred to as a combo patch. Constituent patches may be related by function, subsystem or some other shared characteristic. The patch management system can provides functionality to support creation, distribution, installation and un-installation of multiple patches joined together as an entity (such as in a patchset). Furthermore, the patch management system can provide a mechanism to simplify the process of installing patchsets by enforcing a predefined install and un-install sequence that contemplates dependencies between member patches.

Patchsets can be very similar in appearance to other standard patches. From a data model perspective, patchsets can derive from the structure used to describe standard patches. The distinguishing characteristic of a patchset can be its ability to group together a set of patches and specify the order in which these patches are installed. In one embodiment, the patchset does not physically contain patch artifacts, but consists of metadata referring to other patches and specifying an install sequence for these patches.

Patchsets can appear as independent entities and can be viewed, selected for installation and selected for un-installation in the same manner as standard patches. When installing or un-installing patchsets, constituent patch installation can execute atomically in the sequence specified by patchset metadata. Note that un-installation processes the sequence in reverse order. Validation processing and detection of global patch artifacts can be performed prior to initiation of the installation or un-installation sequence. All related messaging likewise can occurs before installation or un-installation of any included patch.

While patchsets can atomically install constituent patches, each patch exists as an independent entity upon conclusion of installation. Each patch installed as part of a patchset installation can be viewed and un-installed separately. When a patch associated with a patchset is un-installed independently, a warning message is generated indicating that the patchset entry will be removed from the system. The message also indicates that none of the other patches comprising the patchset will be removed. This is consistent with the definition of a patchset, where a patchset is defined as the sum of patches it includes by reference. Removing any patch from the set dissolves the relationship.

Inclusion in a patchset does not affect the member patches. Each member patch retains an independent set of dependencies. This provides clean separation of function enabling the independent un-install of member patches mentioned earlier as well as simplifying the process for creating patchsets.

A patch management system can address the following goals.
Support multiple maintenance models to enable current and future flexibility in business process
   Rolling patch (cumulative)
   One-off
Support multiple patch types, e.g. security patches, one-off fixes and combo patches
Provide single, highly automated tool to consistently package and post patches for customer download and installation
Provide consistent, intuitive and highly automated tool for application of patches to customer system
Integrate service pack and patch tool to provide a single source for processing maintenance
Provide consistent, intuitive and detailed interface to view information about patches applied to a system
Provide programmatic interface to query patch information available for download and applied to the current system
Provide web-based model to procure maintenance, integrating the ability to distribute patches as a static installation to other systems
The patch system can:
Produce Cost savings in support and CCE (Customer Central Engineering).
Create good-will among our most valued customers.
Help align practices across component teams by providing a common model for patches. Good tools that meet targeted use cases promote consistency.
The exemplary use cases below are drafted to describe the requirements for a tool that could be used for patch delivery.

The "tool" as referenced below for purposes of use case description can include currently envisioned to include 2 clients and one server. There may be additional utilities as well. 1) CCE/other client to post patches, create combo patches, define dependencies, etc. 2) Customer client to view available patches, view current maintenance on system, apply patches, remove patches, etc. 3) Smart Update server that satisfies requests from #1 and #2.

1) Basic GA patch a. CCE issues a WLS 9.0 GA patch and labels it with a patch identifier. b. User has installed WLS 9.0 GA on their system, and has reported a bug. Customer support informs the user that a patch is available for the problem and provides a patch identifier. User launches patch tool to retrieve the patch from behind Customer Support login and is able to retrieve and apply the patch after supplying the patch identifier.

2) Basic SP1 patch a. CCE issues a WLS 9.0 SP1 patch and labels it as being dependent on SP1. b. User has installed WLS 9.0 GA on their system and reported a bug. Customer support informs the user that an SP1 patch is available for the problem and provides a patch identifier. User applies SP1 and launches patch tool to retrieve the patch from behind Customer Support login and is able to retrieve and apply the patch after supplying the patch identifier.

3) User verifies patch before applying a. CCE issues a patch and includes information such as the behavior that occurred because of the defect, the circumstances under which the defect occurs, the parts of WLS (subsystem or functionality) that are impacted by the fix, and the risks of applying the fix. b. User has the option of inspecting a manifest before applying the patch or while applying the patch.

4) Patch dependent on another patch for the same component a. CCE issues WLS 9.0 GA patch B and labels it as being dependent on patch A. b. User has installed WLS 9.0 GA on their system, and has reported a bug. Customer support informs the user that a patch is available for the problem and provides a patch identifier for this patch (B), as well as a patch identifier for a patch (A) that this patch is dependent on. User launches patch tool to retrieve the patches from behind Customer Support login and is able to apply patch A then patch B.

Automatic application of the dependent patch can be done. The user can be informed of the dependency and retains the flexibility to inspect the dependent patch that is referenced earlier.

5) Patch for one component dependent on another patch for a different component a. CCE issues WLI 9.0 GA Patch B and labels it as being dependent on WLS 9.0 SP1 Patch A. b. User has installed WLI 9.0 GA and WLS 9.0 SP1 on their system and has reported a bug. Customer support informs the user that a WLI patch is available for the problem and provides a patch identifier for a WLI patch (B), as well as a patch identifier for a WLS patch (A) that this patch is dependent on. User launches patch tool to retrieve the patches from behind Customer Support login and is able to apply patch A then patch B.

6) Disconnected access to patches a. User wishes to apply patch to WLI 9.0 GA and WLS 9.0 SP1 on a target system that does not have Internet access. User launches patch tool from a system that does have Internet access, and is able to retrieve the patch and copy the patch file to the target system, where the filename and path can be specified in order to apply the patch.

7) Patch dependent on SP level and user prevented from applying when SP dependency not met a. CCE issues WLI 9.0 SP1 Patch that is dependent on WLI 9.0 SP1. b. User has heard that a WLI 9.0 patch addresses the problem they are having, but is unaware that WLI 9.0 patch is dependent on WLI 9.0 SP1, and has WLI 9.0 GA installed on their system.

The user obtains a copy of the patch from a colleague. The user launches patch tool and attempts to apply the patch. The user is warned that SP1 is a prerequisite for the Patch, and SP1 must be installed first before the patch can be applied.

8) Patch dependent on another patch, and user warned when dependency not met a. CCE issues WLI 9.0 GA Patch B that is dependent on WLI 9.0 GA Patch A. b. User has heard that a WLI 9.0 GA patch B addresses the problem they are having, but is unaware that WLI 9.0 GA patch B is dependent on WLS 9.0 SP1 Patch A, and does not have Patch A installed on their system. The user obtains a copy of patch B from a colleague. The user launches patch tool and attempts to apply Patch B. The user is warned that Patch A is a prerequisite for Patch B, and is asked whether they wish to continue or wish to apply Patch A first.

Note: Implicit in "warning" when depending on another patch, vs. "preventing" when depending on an SP is that we have greater confidence in imposing SP dependencies, and are less confident in being this restrictive when "requiring" other patches. For example we may determine (after having established the dependency relationships) that an alternative dependent patch is superior. We need feedback from CCE/Customer Support on this point in general on whether there is a "weak" dependency requirement or similar requirement for enabling flexibility in defining dependency relationships. The downside of providing "warning" (only) is that it provides users with more flexibility to get themselves into unsupportable configurations—see "rollback" and "paint in a corner" cases below.

9) Combo patch a. CCE selects a set of patches that solve commonly encountered problems, and creates a "combo patch" out of these. b. User experiences a number of problems that affect multiple WebLogic Platform components and appear interrelated and contacts Customer Support. Customer Support informs the user that a "combo patch" has been created that addresses these issues, and contains multiple individual component patches. User launches patch tool and is able to retrieve and apply the combo patch.

10) Combo patch layered on subset of constituent patches a. CCE selects a set of patches that solve commonly encountered problems, and creates a "combo patch" out of these. b. User has been experiencing a number of problems, over time, that affect multiple WebLogic Platform components and appear interrelated. User experiences another problem in this area and contacts Customer Support. Customer Support informs the user that a "combo patch" has been created that addresses these issues, and contains multiple individual component patches. User launches patch tool and is able to retrieve the combo patch. The patch tool recognizes that several of the individual patches included in the combo patch have already been applied, and applies only the incremental patches contained within the combo patch.

11) Combo patch meets dependency requirement for constituent patches a. CCE creates a combo patch X (containing ABC) and a patch D that is dependent on B. b. User who has applied combo patch X can apply patch D.

12) Patch conflicts a. CCE creates patch D that cannot be used with patch A, B, C. b. User experiences problem and contacts Customer Support. Customer Support informs the user that a patch D exists to fix the problem, and tells the user that this patch conflicts with other patches A, B, C and cannot be used with them. The user forgets this piece of information, launches patch tool and is able to retrieve the patch. When the user attempts to apply the patch the user is informed that the patch conflicts with other patches on the user's system.

13) Patch uninstall/rollback a. CCE creates a patch for WLS 9.0 GA b. User applies the patch and it exacerbates their problem. User rolls back to previous state, unapplying the patch, and continues debugging the problem with Customer Support.

14) Display version/SP/patch level a. CCE labels all 9.0 patches with patch identifiers. b. User call Customer Support with a problem on WLI 9.0 GA and WLS 9.0 SP1. Customer Support asks the user which product version, SP level and which patches are installed on the user system. The user is able to access this information programmatically or from the tool.

15) Patch uniqueness a. CCE labels all 9.0 patches. b. All Platform patches are unique (no duplicate names) as perceived by end users.

16) Avoid painting customers into corner a. CCE labels all 9.0 patches with patch identifiers, and many patches have dependencies and/or conflicts, but provides sufficient flexibility to end users or enforces sufficient rigor internally to ensure that users can manage multiple applications of patches. B. User is never placed in a situation where, because of patch dependencies and conflicts, and potential rollback restrictions, he is unable to rollback to a supportable configuration, and is forced to reinstall the product and reapply large numbers of patches.

One embodiment may be implemented using a conventional general purpose of a specialized digital computer or microprocessor(s) programmed according to the teachings of the present disclosure, as will be apparent to those skilled in the computer art. Appropriate software coding can readily be prepared by skilled programmers based on the teachings of the present discloser, as will be apparent to those skilled in the software art. The invention may also be implemented by the preparation of integrated circuits or by interconnecting an appropriate network of conventional component circuits, as will be readily apparent to those skilled in the art.

One embodiment includes a computer program product which is a storage medium (media) having instructions stored thereon/in which can be used to program a computer to perform any of the features present herein. The storage medium can include, but is not limited to, any type of disk including floppy disks, optical discs, DVD, CD-ROMs, micro drive, and magneto-optical disks, ROMs, RAMs, EPROMs, EEPROMs, DRAMs, flash memory of media or device suitable for storing instructions and/or data stored on any one of the computer readable medium (media), the present invention can include software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, execution environments/containers, and user applications.

Embodiments of the present invention can include providing code for implementing processes of the present invention. The providing can include providing code to a user in any manner. For example, the providing can include transmitting digital signals containing the code to a user; providing the code on a physical media to a user; or any other method of making the code available.

Embodiments of the present invention can include a computer implemented method for transmitting code which can be executed at a computer to perform any of the processes of embodiments of the present invention. The transmitting can include transfer through any portion of a network, such as the Internet; through wires, the atmosphere or space; or any other type of transmission. The transmitting can include initiating a transmission of code; or causing the code to pass into any region or country from another region or country. For example, transmitting includes causing the transfer of code through a portion of a network as a result of previously addressing and sending data including the code to a user. A transmission to a user can include any transmission received by the user in any region or country, regardless of the location from which the transmission is sent.

Embodiments of the present invention can include a signal containing code which can be executed at a computer to perform any of the processes of embodiments of the present invention. The signal can be transmitted through a network, such as the Internet; through wires, the atmosphere or space; or any other type of transmission. The entire signal need not be in transit at the same time. The signal can extend in time over the period of its transfer. The signal is not to be considered as a snapshot of what is currently in transit.

The forgoing description of preferred embodiments of the present invention has been provided for the purposes of illustration and description. It is not intended to be exhaustive or to limit the invention to the precise forms disclosed. Many modifications and variations will be apparent to one of ordinary skill in the relevant arts. For example, steps preformed in the embodiments of the invention disclosed can be performed in alternate orders, certain steps can be omitted, and additional steps can be added. The embodiments where chosen and described in order to best explain the principles of the invention and its practical application, thereby enabling others skilled in the art to understand the invention for various embodiments and with various modifications that are suited to the particular used contemplated. It is intended that the scope of the invention be defined by the claims and their equivalents.

What is claimed is:

1. A method of managing and applying patches for software programs, comprising the steps of:

providing at a computer, including a processor and memory, a central patch management system which includes a global patch depository that stores available patches or patch information, for application to software programs running on local machines, wherein each particular patch or patch information in the global patch depository has associated therewith a metadata that is used to determine relationships and dependencies with other patches, including information describing how the particular patch or patch information is to be applied with respect to previously installed patches, and information describing how the patch can be rolled back, and a scope information that indicates how the patch is scoped;

providing at one or more local machines which includes one or more installed software programs, a local patch management system which includes a local patch depository, that is used to store selected patches or patch information from the global patch depository, and apply the selected patches or patch information for the one or more installed software programs on that local machine, and a maintenance archive which maintains indications of files and classes from previously-applied patches to enable rollback; and using the metadata and the scope information associated with each patch or patch information, including the relationships and dependencies determined thereby, to control the packaging and application of the selected patches or patch information to the software programs at the local machines, in accordance with their scope, including during installation of a particular patch injecting that patch into the archive and storing backup files as necessary to enable rollback.

2. The method of claim 1, wherein each local patch management on a particular local machine can support multiple domains operating on that local machine, for running the one or more installed software programs therein, and wherein each domain operating on that local machine includes its own patch configuration, and wherein at least some of the patches are domain-scoped so that the system can be used to patch each domain's patch configuration independently of one another.

3. The method of claim 2, wherein a first domain and its own patch configuration is used as a test environment for the software program, and wherein a second domain and its own patch configuration is used as a production environment for the software program, and wherein the domain-scoped patches can be independently applied to either, or both domains.

4. The method of claim 1, wherein the patch management system maintains the patch configurations for multiple software programs.

5. The method of claim 1, wherein the software program is an application server program.

6. The method of claim 1, wherein the patch management system keeps track of files and class paths modified, during application of any patch, and allows the rollback of a patch without requiring the software program to be reinstalled.

7. A system for use in managing and applying patches for software programs, comprising:
   a computer, including a processor and memory, wherein the computer further includes
      a central patch management system which includes a global patch depository that stores available patches or patch information, for application to software programs running on local machines, and
      wherein each particular patch or patch information in the global patch depository has associated therewith
         a metadata that is used to determine relationships and dependencies with other patches, including
            information describing how the particular patch or patch information is to be applied with respect to previously installed patches, and
            information describing how the patch can be rolled back, and
         a scope information that indicates how the patch is scoped;
   one or more local machines, wherein each local machine includes
      one or more installed software programs, and
      a local patch management system which includes
         a local patch depository, that is used to store selected patches or patch information retrieved from the global patch depository, and apply the selected patches or patch information for the one or more installed software programs on that local machine, and
         a maintenance archive which maintains indications of files and classes from previously-applied patches to enable rollback; and
   wherein the system uses the metadata and the scope information associated with each patch or patch information, including the relationships and dependencies determined thereby, to control the packaging and application of the selected patches or patch information to the software programs at the local machines, in accordance with their scope, including during installation of a particular patch injecting that patch into the archive and storing backup files as necessary to enable rollback.

8. The patch management system of claim 7, wherein each local patch management on a particular local machine can support multiple domains operating on that local machine, for running the one or more installed software programs therein, and wherein each domain operating on that local machine includes its own patch configuration, and wherein at least some of the patches are domain-scoped so that the system can be used to patch each domain's patch configuration independently of one another.

9. The patch management system of claim 8, wherein a first domain and its own patch configuration is used as a test environment for the software program, and wherein a second domain and its own patch configuration is used as a production environment for the software program, and wherein the domain-scoped patches can be independently applied to either, or both domains.

10. The patch management system of claim 7, wherein the patch management system maintains the patch configurations for multiple software programs.

11. The patch management system of claim 7, wherein the software program is an application server program.

12. The patch management system of claim 7, wherein the local patch management system includes a graphical interface, that allows a user at a local machine to select the patches to be applied to the software programs at that location machine.

13. The patch management system of claim 12, wherein the graphical interface is adapted to show the applied patches.

14. The patch management system of claim 12, wherein the graphical interface is adapted to show available patches.

15. The patch management system of claim 7, wherein the patch management system keeps track of files and class paths modified, during application of any patch, and allows the rollback of a patch without requiring the software program to be reinstalled.

16. The patch management system of claim 7, wherein the patch management system allows for the installation of service packs.

17. The patch management system of claim 16, wherein the patches depend on a service pack such that the installation of a new service pack removes the patches.

18. The patch management system of claim 7, wherein the patch management system performs dependency checking using the metadata to determine whether a patch to be applied conflicts with a previously applied patch.

19. The patch management system of claim 7 wherein the local patch management system can connect to a server using the Internet to obtain patches from the global patch depository at the server.

20. A non-transitory computer readable storage medium, including instructions stored thereon, which when read and executed by one or more computers, cause the one or more computers to perform the steps comprising:
   providing at a computer, including a processor and memory, a central patch management system which includes a global patch depository that stores available patches or patch information, for application to software programs running on local machines, wherein each particular patch or patch information in the global patch depository has associated therewith
      a metadata that is used to determine relationships and dependencies with other patches, including
         information describing how the particular patch or patch information is to be applied with respect to previously installed patches, and information describing how the patch can be rolled back, and a scope information that indicates how the patch is scoped;

providing at one or more local machines which includes one or more installed software programs, a local patch management system which includes a local patch depository, that is used to store selected patches or patch information from the global patch depository, and apply the selected patches or patch information for the one or more installed software programs on that local machine, and a maintenance archive which maintains indications of files and classes from previously-applied patches to enable rollback; and using the metadata and the scope information associated with each patch or patch information, including the relationships and dependencies determined thereby, to control the packaging and application of the selected patches or patch information to the software programs at the local machines, in accordance with their scope, including during installation of a particular patch injecting that patch into the archive and storing backup files as necessary to enable rollback.

\* \* \* \* \*

UNITED STATES PATENT AND TRADEMARK OFFICE
CERTIFICATE OF CORRECTION

Page 1 of 2

PATENT NO. : 8,245,216 B2
APPLICATION NO. : 11/539261
DATED : August 14, 2012
INVENTOR(S) : Felts It is certified that error appears in the above-identified patent and that said Letters Patent is hereby corrected as shown below:

On sheet 2 of 40, Box 112, in figure 1B, line 3, delete "sevice" and insert -- service --, therefor.

On sheet 2 of 40, Box 114, in figure 1B, line 3, delete "sevice" and insert -- service --, therefor.

On sheet 8 of 40, in figure 5A, line 24, delete "implicications" and insert -- implications --, therefor.

On sheet 33 of 40, in figure 17M, line 6, delete "Repositor" and insert -- Repository --, therefor.

In column 1, line 47, after "embodiment" insert -- . --.

In column 3, line 63, delete "superceded" and insert -- superseded --, therefor.

In column 4, line 36, delete "suppler." and insert -- supplier. --, therefor.

In column 5, line 47, delete "roll back" and insert -- rollback --, therefor.

In column 5, line 58, delete "Customer-." and insert -- Customer- --, therefor.

In column 7, line 43, delete "boundary," and insert -- boundary. --, therefor.

In column 7, line 45, after "classpath" insert -- . --.

In column 7, line 55, delete "tiles" and insert -- files --, therefor.

In column 7, line 61, delete "that," and insert -- that --, therefor.

In column 8, line 18, delete "effectively," and insert -- effectively. --, therefor.

In column 8, line 43, delete "duplicates" and insert -- duplicate --, therefor.

In column 8, line 47, delete "Patch 1 and Patch 1" and insert -- Patch 1 and Patch 2 --, therefor.

In column 9, line 33, delete "Ptch" and insert -- Patch --, therefor.

Signed and Sealed this
Twentieth Day of November, 2012

David J. Kappos
*Director of the United States Patent and Trademark Office*

CERTIFICATE OF CORRECTION (continued)
U.S. Pat. No. 8,245,216 B2

In column 12, line 17, delete "Upadate" and insert -- Update --, therefor.

In column 12, line 35, after "infrastructure" insert -- . --.

In column 12, line 47, after "HTML" insert -- . --.

In column 12, line 49, delete "crated" and insert -- created --, therefor.

In column 12, line 50, delete "molded" and insert -- modeled. --, therefor.

In column 13, line 30, after "install" insert -- . --.

In column 13, line 33, delete ""C:\" and insert -- "c:\ --, therefor.

In column 22, line 48, in Claim 19, delete "claim 7" and insert -- claim 7, --, therefor.